United States Patent
Wright

(10) Patent No.: US 7,693,082 B2
(45) Date of Patent: Apr. 6, 2010

(54) LATENCY MEASUREMENT APPARATUS AND METHOD

(75) Inventor: Charles R. Wright, Winchester, MA (US)

(73) Assignee: Azimuth Systems, Inc., Acton, MA (US)

( * ) Notice: Subject to any disclaimer, the term of this patent is extended or adjusted under 35 U.S.C. 154(b) by 954 days.

(21) Appl. No.: 11/208,151

(22) Filed: Aug. 19, 2005

(65) Prior Publication Data

US 2006/0233111 A1    Oct. 19, 2006

Related U.S. Application Data

(60) Provisional application No. 60/670,522, filed on Apr. 12, 2005.

(51) Int. Cl.
*H04L 12/26* (2006.01)
(52) U.S. Cl. .................................. 370/246; 370/252
(58) Field of Classification Search ............... 375/224, 375/225, 226, 227; 370/252, 389, 392, 394, 370/509, 519, 246; 455/423, 226.1, 226.4
See application file for complete search history.

(56) References Cited

U.S. PATENT DOCUMENTS

| 6,681,228 B2 * | 1/2004 | Balogh ........................ 707/10 |
| 7,333,517 B2 * | 2/2008 | Madhavapeddi et al. .... 370/509 |
| 2006/0005074 A1 * | 1/2006 | Yanai et al. .................... 714/5 |

* cited by examiner

*Primary Examiner*—Melvin Marcelo
(74) *Attorney, Agent, or Firm*—Anderson Gorecki & Manaras LLP

(57) ABSTRACT

A modular test chassis for use in testing wireless devices includes a backplane and a channel emulation module coupled to the backplane. The channel emulation module comprises circuitry for emulating the effects of a dynamic physical environment (including air, interfering signals, interfering structures, movement, etc.) on signals in the transmission channel shared by the first and second device. Different channel emulation modules may be included in the test system depending upon the protocol, network topology or capability under test. A test module may be provided to generate traffic at multiple interfaces of SISO or MIMO DUTs to enable thorough testing of device and system behavior in the presence of emulated network traffic and fault conditions. A latency measurement system and method applies timestamps frames as they are transmit and received at the test module for improved latency measurement accuracy.

15 Claims, 22 Drawing Sheets

LATENCY MEASUREMENT APPARATUS AND METHOD

RELATED APPLICATIONS

This application claims priority under 35 U.S.C. §119(e) to provisional patent application Ser. No. 60/670,522 filed Apr. 12, 2005 by Mlinarsky and Wright, incorporated herein by reference.

FIELD OF THE INVENTION

This invention relates generally to the field of test equipment, and more particularly to an improved architecture for use in testing wireless devices.

BACKGROUND OF THE INVENTION

New wireless technology is being developed and deployed to provide support for voice and multimedia services in both residential and enterprise environments. Wireless Local Area Network ("WLAN") devices, for example, are being developed in conjunction with IEEE 802.11 standards to support packetized voice communications such as Voice over Internet Protocol ("VoIP"). There are technological hurdles that must be overcome in order to support voice and multimedia on WLANs because the technology was initially designed to support simple data communications. In particular, voice and multimedia applications can be more sensitive to jitter, delay and packet loss than data communications applications. IEEE 802.11 is under development, and continually provides new protocols and techniques which seek to overcome some of these technological hurdles as well as to increase the capacity of a wireless network.

Because the costs associated with developing, purchasing, selling and deploying a new wireless technology are often quite high, it is common to conduct testing to mitigate the risk that the technology will fail to perform as planned. However, wireless devices are notoriously difficult to test because they can be affected by ambient sources of interference. Further, the conditions to which a wireless device may be subjected in actual use are so great in number that it is difficult and time-consuming to create all of those conditions in a test environment. It is known, for example, to simulate some wireless network operations by manually moving a wireless device through a building in which wireless access devices are strategically situated. However, this technique is too labor-intensive and imprecise to simulate a wide variety of traffic conditions, distances between access points and rates of motion in a practical manner. Further, such a manual, open-air test can be rendered invalid by transient interference from a microwave, RADAR or other RF source. More recently it has become known to simulate a wireless network by enclosing devices in EMI-shielded containers which are in communication via wired connections. Such a system is disclosed in U.S. Pat. No. 6,724,730 entitled "Test System for Simulating a Wireless Environment and Method of Using Same", by Mlinarsky et al. (herein after the Mlinarsky patent) which is incorporated herein by reference.

FIG. 1 illustrates the prior art architecture of Mlinarsky. A central RF combiner 110 connected to a plurality of connection nodes 102 via programmable attenuation components 108. A controller console controls the programmable attenuation component for the purposes of simulating spatial positioning of the plurality of connection nodes to facilitate operational testing of the nodes. As shown in FIG. 1, the RF combiner arrangement enables simulation of movement by the coupled nodes along the links of the star topology. While this architecture is effective for simulating movement within the topology, the simulation of multi-dimensional movement is restricted by the available connections. It would therefore be desirable to identify an improved architecture which is capable of providing full nodal connectivity to simulate movement in multiple dimensions.

In addition to identifying an architecture with increased movement simulation capabilities, it would also desirable to identify a wireless test architecture capable of adequately testing the operation of Multiple Input, Multiple Output (MIMO) devices as defined in IEEE 802.11n™. 802.11n is new standard for high-speed wireless local area networking, offering throughput greater than 100 Mbps. 802.11n works by utilizing multiple wireless antennas in tandem to transmit and receive data. The associated term "MIMO" refers to the ability of 802.11n (and other similar technologies) to coordinate multiple simultaneous radio signals. MIMO increases both the range and throughput of a wireless network by taking advantage of the distinguishability of signals transmitted on the same FCC allocated radio channel by different radios.

In general MIMO uses multiple antennas to send multiple distinct signals across different spatial paths at the same time, increasing throughput. The radio signals are naturally reflected, absorbed and diffracted as they propagate through different materials in any enclosed space. The reflections arrive at a receiver with unpredictable amplitude, time and phase relationships, causing multipath distortion of the original signal. High data-rate signals are more susceptible to multipath, which has traditionally limited speed and range. The higher the data rate, the more detrimental the multipath distortion is to the signal. MIMO signal processing exploits- the fact that each different spatial path has different multipath, by essentially 'training' the receivers to associate the differently distorted received signals with different radios. This allows MIMO receivers to recover the multiple distinct transmitted signals.

A variety of wireless products will shortly be introduced that operate according to the 802.11n protocol. Prior to their introduction, it will be desirable for vendors to identify methods of testing their devices in order that they may verify the products' ability to operate according to the protocol, and also to quantify the capabilities of their product. It would therefore be desirable to identify a test architecture which would permit verification of devices operating under the 802.11n protocol.

SUMMARY OF THE INVENTION

According to one aspect of the invention, a system for testing wireless devices includes an RF backplane and a channel emulation module couplable to the RF backplane. One or more RF combiners may be coupled to the RF backplane, wherein each of the RF combiners includes a plurality of RF connectors adapted to exchange RF signals with a first test device. The channel emulation module also includes at least one RF connector adapted to exchange RF signals with a second test device. The first test device and second test device communicate over selected transmission channels. The channel emulation module comprises circuitry for emulating the effects of a physical environment (including air, interfering signals, interfering structures, etc.) on signals in the transmission channel. The effects that are emulated by the channel emulation module are referred to herein as 'channel effects,' and include but are not limited to multipath reflections, delay spread, angle of arrival, power angular spread, angle of departure, antenna spacing, uniform linear array for both TX and RX side, Doppler due to fluorescent light effects, Doppler from moving vehicle, Doppler from changing environments, path loss, shadow fading effects and reflections in clusters.

The channel emulation module modifies the physical layer of wireless transmissions in accordance with the channel effect to be emulated, for example by increasing signal attenuation to simulate path loss in the transmission channel coupling the test devices. Different channel emulation modules may be included in the test system depending upon the protocol, network topology or capability under test. For example, attenuation channel emulation modules may be used to model path loss for wireless systems that use Single Input, Single Output or Multiple Input, Multiple Output transmission channels. A cross-connect channel emulation module may be used to emulate multi-dimensional spatial movement of the coupled test devices for enhanced testing of roaming capabilities. Multipath channel emulation modules may be used to emulate multipath signal effects for the purposes of testing Multiple Input, Multiple Output (MIMO) and beam forming technologies. Any combination of the channel emulation capabilities may be included in different embodiments of a channel emulator module.

The channel emulator module is thus an interchangeable component, of a modular wireless network test architecture that enables testing of a wide range of wireless protocols and network topologies. The modular nature of the RF combiners and the channel emulator modules makes it easy to change test network configuration by simply adding or removing the combiners and modules on either side of the backplane.

According to another aspect of the invention, a test module is provided for incorporation in a test environment. The test module includes circuitry for simultaneously generating network traffic over multiple network interfaces. In addition, the test module combines client and access point (AP) emulation capabilities with a powerful protocol test automation environment to enable thorough testing of device and system behavior in the presence of emulated network traffic and fault conditions.

According to another aspect of the invention, the test module includes a latency measurement method and apparatus, which applies time stamps to frames as they are transmitted and received at various network interfaces of the test module. Time stamping frames as they are transmitted and received reduces nondeterministic delay in the measurement process, thereby increasing the accuracy of the latency measurement.

DETAILED DESCRIPTION

An improved test architecture which may be used to test the operation of wireless devices will now be described. As will be seen, the architecture is modular in nature and enables testing of a variety of network protocols and topologies. For example the architecture may be used to test Single Input, Single Output (SISO) 802.11a, b or g devices as well as 802.11n Multiple Input, Multiple Output (MIMO) devices. In addition to supporting a variety of protocols, the modular nature of the components allows multiplet network topologies and multi-dimensional movement to be simulated with ease.

Figure 1:
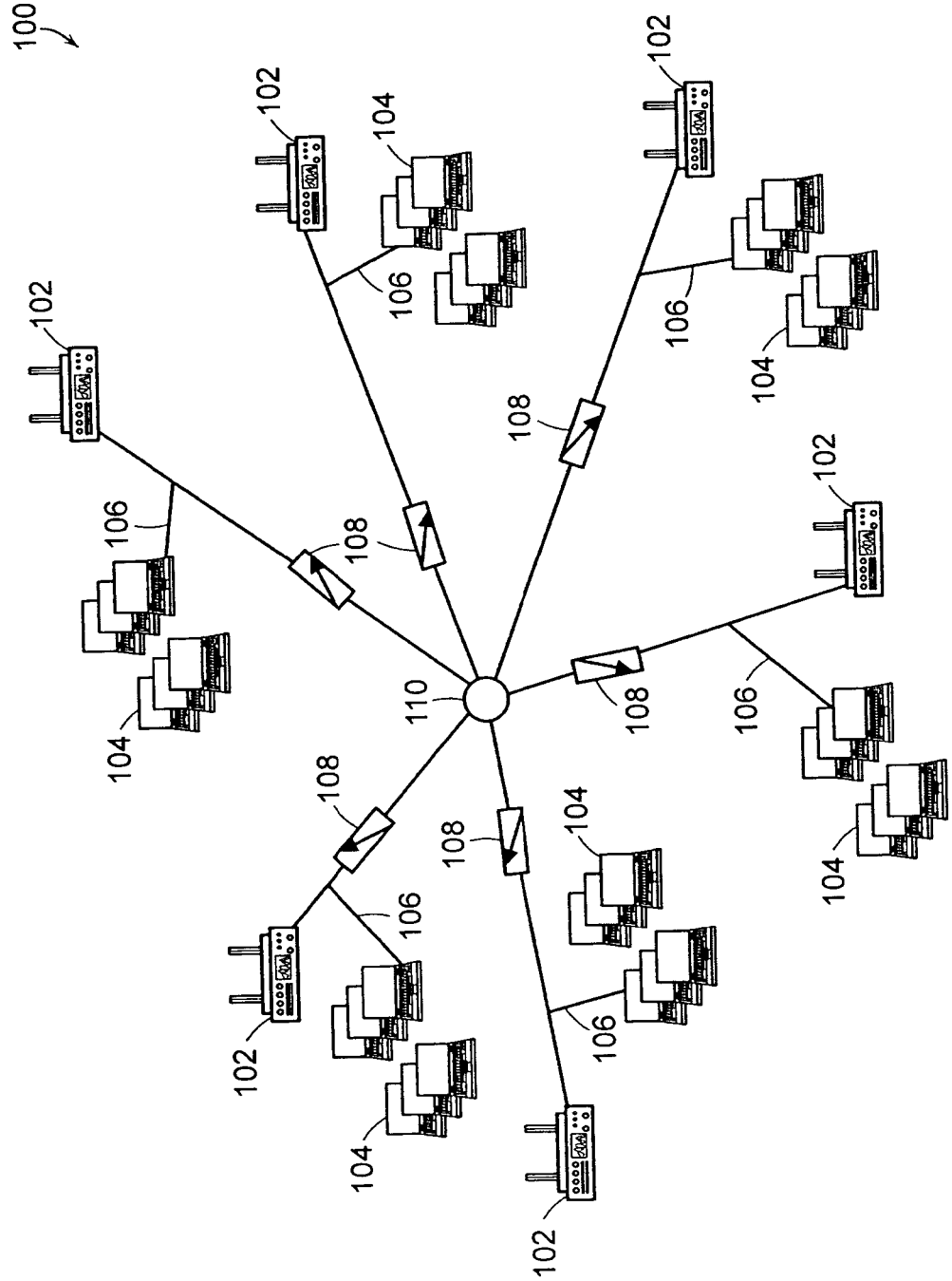
FIG. 1 illustrates a prior art wireless testing environment.
Figure 2:
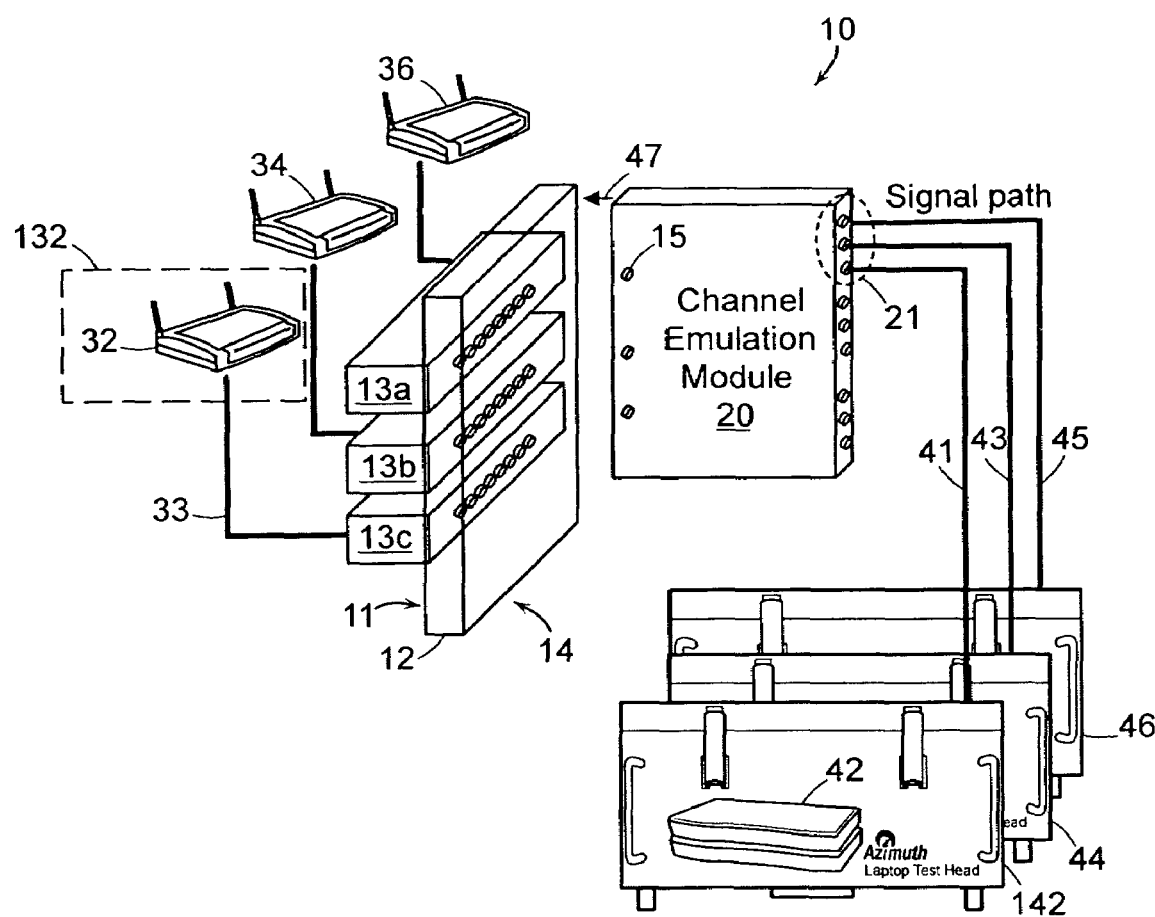
FIG. 2 illustrates a wireless testing environment including a modular test chassis of the present invention.

Referring now to FIG. 2, one embodiment of a wireless test system 10 utilizing the architecture of the present invention is shown. The test system 10 is shown to include a backplane matrix 12. The backplane matrix may be housed in an enclosure (not shown), and together the backplane and enclosure comprise a test chassis. The backplane matrix 12 includes slots for coupling one or more RF combiners 13a-13c. Each RF combiner 13a-13c is a modular component having a number of RF connectors for receiving RF signals from coupled RF devices. An exemplary RF combiner that may be used is described in U.S. Pat. No. 6,724,730, incorporated herein by reference and referred to hereinafter as the Mlinarsky patent. In general each RF combiner is a communication hub which connects all RF devices coupled to the individual combiner. Each RF combiner includes N connectors enabling communication between N devices. Although the RF combiner of FIG. 2 includes 8 connectors, it should be appreciated that the present invention is not limited to any particular number of connectors. In addition, although the figures and description will reference a system which uses a backplane for supporting any number of combiners, it is appreciated that equivalent functionality may be achieved through a variety of designs and the invention is not meant to be limited in any manner by the disclosed embodiment.

Another type of module which may be coupled to the test chassis is a channel emulation module 20. Channel emulation module 20 is coupled to a column of connectors on a front face 14 of the backplane matrix 12 via backplane connector column 15. The channel emulation module also includes at least one column of one or more RF ports 21 (shown grouped in a dashed ellipse in FIG. 2) which are used to couple the channel emulation module to an RF device such as device 42. Together the channel emulation module, RF combiners and backplane matrix form a test system which may be used to test one or more wireless devices.

Depending upon the desired test environment, different numbers of RF combiners and channel emulator modules may be swapped into and out of the chassis. As will be shown in several embodiments below, the test environment may be modified in an N dimension by adding or removing RF combiners, and may be modified in an M dimension by addition or removing channel emulator modules. The modular nature of the architecture increases the ease of configuration of different test environments, thereby enabling more robust testing of devices to be performed at a common test chassis.

As will be described in more detail below, the channel emulation module comprises circuitry for emulating the effects of a physical environment (air, interference, etc.) on signals in a transmission channel. The emulation circuitry modifies the physical layer of wireless transmissions in accordance with the emulated effect, for example by increasing or decreasing attenuation or gain to emulate path-loss or fading resulting from movement and changing environmental artifacts. Different channel emulation modules may be swapped into the wireless test system 10 depending upon the network protocol, topology or capability that it is desired to test.

For the purposes of this application, a 'device under test' (DUT) is any device whose operation and/or performance is being monitored or analyzed; a System Under Test (SUT) is a wireless system including one or more DUTs; and a test device is a device included in the test network which is used to exercise or monitor the DUT during a test as part of the test bed. The wireless test system of the present invention supports testing of a variety of RF devices and a variety of RF protocols. In general, the DUTs' behavior in response to test stimulus, wherein the test stimulus may be a changing physical environment, is monitored and analyzed. Because of the inherent sensitivity of wireless devices to their physical RF environment, and in order to ensure that behavior of the DUT is attributable only to the test stimulus, test devices and DUTs (such as devices 32 and 42) are generally isolated from environmental effects, and each other, by placement in shielded test chambers (test "heads"), such as chambers 132 and 142. Shielded RF cables 33 and 41 are coupled to the RF antenna ports of the test devices, and are used to couple the DUTs and test devices to their respective RF combiner and channel emulation connectors. Isolating the devices and their RF signals using test heads and cables in this manner helps to ensure that the behavior of the devices is attributable only to the test stimuli, the application of which is controlled by the channel emulation module 20.

Figure 19:
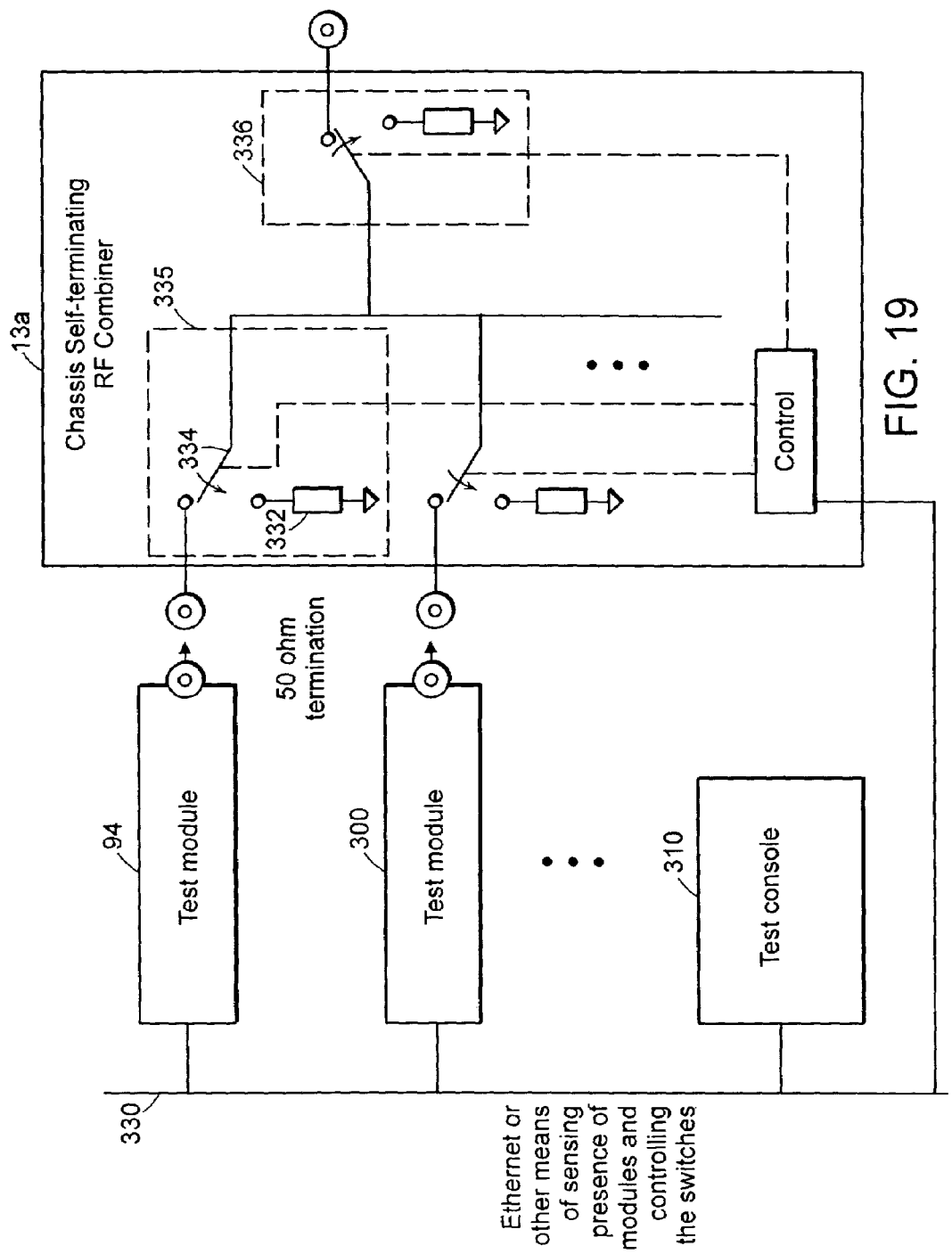
FIG. 19 is a diagram illustrating self-termination circuitry that may be included in the RF combiner to, automatically provide characteristic impedance termination when a chassis slot is not populated by a module.

Referring briefly to FIG. 19 according to one aspect of the invention the RF combiners such as combiner 13a each include self-terminating circuitry 335. The RF combiner essentially adds all signals coupled to the RF combiner ports, and thus a non-terminated port would serve to add unpredictable artifacts to the combined signals. The RF combiner of the present invention includes a self terminating device 335 which automatically senses when a port is unconnected, and self-terminates to further isolate the combined signals from residual interference.

Referring back now to FIG. 2, as mentioned above, the operative capabilities of devices 32 and 42 may be tested by emulating a changing physical environment between the devices, and monitoring the devices' operation in the changing environment. The physical signals in the transmission channel are modified by the channel emulation module in accordance with the effect being emulated in the channel. The effects that are emulated by the channel emulation module are referred to herein as 'channel effects,' and include but are not limited to multipath reflections, delay spread, angle of arrival, power angular spread, angle of departure, antenna spacing, uniform linear array for both TX and RX side, Doppler due to fluorescent light effects, Doppler from moving vehicle, Doppler from changing environments, path loss, shadow fading effects, reflections in clusters and external interference such as radar signals, microwave oven emissions, phone transmission and other wireless signals or noise. The channel effects may be applied to data transmission signals going through the channel emulation module or the channel emulation module can serve as an interference generator with no signals at its input. Several embodiments of channel emulation modules which may be used to test various network topologies, protocols and capabilities will be disclosed herein. The channel emulation modules that will be described below include an attenuation channel emulation module (for use in either Single Input, Single Output test environments or Multiple Input, Multiple Output test environments), a Cross-connect channel emulation module, a Multiple Input, Multiple Output channel emulation module and attest module. However it should be appreciated that the disclosed channel emulation modules are merely representative, and that any variety of other channel emulation modules that emulate channel effects of various complexity may be substituted herein without affecting the scope of the present invention. In addition, although the below channel emulation modules are shown and described as used with the backplane, it should be appreciated that they may also be used in test environments without the backplane, by directly connecting test devices and/or DUTs to RF connectors on the modules that mate with the backplane.

Attenuation Channel Emulation Module

FIG. 2 illustrates one test environment 10 which includes a channel emulation module 20 used to test relationships between Single Input, Single Output (SISO) protocol devices. Such protocols include but are not limited to any of the 802.11a, b or g protocols. FIG. 2 illustrates several access points 32, 34 and 36 which are coupled to several client laptops 42, 44 and 46 in a SISO test environment. Frequently it is desirable to test the behavior of SISO devices in response to changing physical environments caused, for example, by spatial movement of the devices or the introduction interference into the network. One relatively straightforward embodiment of a channel emulation module 20-1 is shown in more detail in FIG. 3. The channel emulation module 20-1 of FIG. 3 includes a programmable attenuator, such as attenuator 210, disposed in each transmission path between the RF backplane and the RF ports of the channel emulation module 20-1. In a SISO environment, the signals 47 received from the backplane are associated with different RF devices coupled to the RF combiners; and may utilize different transmission channels. In a test environment such as that illustrated in FIG. 2, each signal 41, 43 and 45 is also associated with a different RF device. Essentially, the programmable attenuator provides a means for controlling the attenuation of signals transferred between the different test devices. Appropriate control of each of the programmable attenuators may be used to emulate channel behavior in response to device movement or interference.

Although the channel emulation module 20-1 has been shown and described in a SISO environment, it can be appreciated that the same circuitry may be used to provide low cost channel emulation in a Multiple Input, Multiple Output environment (MIMO). Although the circuitry 20-1 may have limited use in testing MIMO radio performance, it may be helpful for the purpose of testing Medium Access Control (MAC) and higher level protocols. In such a MIMO SUT, signals 47 are coupled to different radios of a first MIMO DUT, signals 41, 43 and 45 are coupled to different radios of a second MIMO DUT, and the programmable attenuators 210 are a low cost method of emulating channel behavior. More details of MIMO operation and other embodiments of channel emulation modules that may be used to model MIMO multipath behavior will be described later herein. Accordingly, the channel emulation circuitry of module 20-1 is a low cost module alternative that may be used to test a variety of wireless protocols.

Cross-Connect Channel Emulation Module

Figure 3:
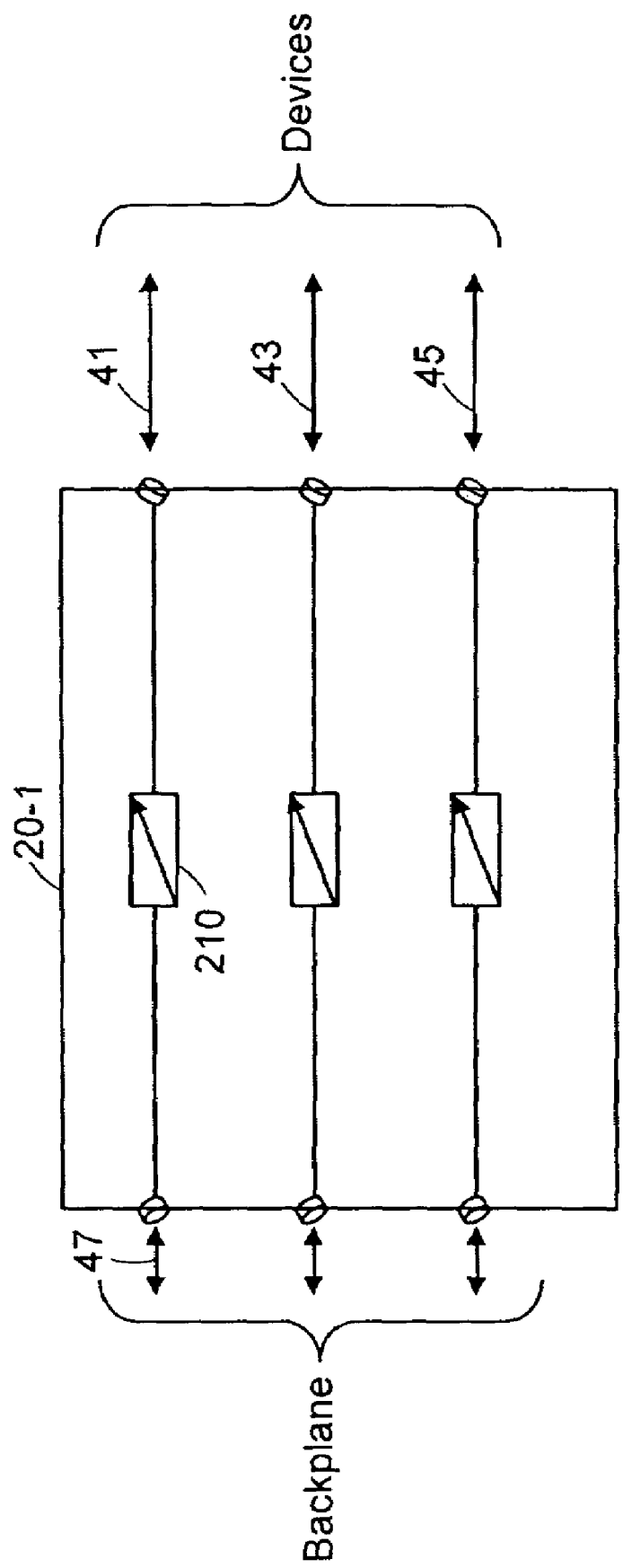
FIG. 3 is a diagram of one embodiment of circuitry that may be included in an attenuation channel emulation module included in test chassis of FIG. 2.

While the channel emulation module 20-1 of FIG. 3 provides a cost-effective method for simulation of movement between two SISO devices, it is often desirable to simulate multi-dimensional spatial movement between two devices to increase the robustness of roaming simulation and test platforms. According to another aspect of the invention, a cross connect channel emulation module may be used in a SISO environment to provide mesh attenuation connectivity between DUTs and test devices, thereby increasing the available network test topologies as well as providing a foundation for simulation of multi-dimensional spatial movement between test devices. Exemplary circuitry that may be included in such a cross-connect channel emulation module 20-2 is shown in FIG. 4.

The ability to provide mesh connectivity with attenuation allows multi-dimensional movement to be simulated with increased ease and accuracy. As used herein, 'mesh' connectivity is meant to convey that a path is available from each test device to any other test device in the network. Mesh connectivity is achieved through a combination of the RF combiners and the backplane; each RF signal coupled to an individual RF combiner is available to any column of the backplane matrix. The channel emulation module 20-2 may be included in the test system of FIG. 2 and controlled to emulate the movement of client devices 42, 44 and 46 to monitor whether and when roaming between APs 32, 34 and 36 occurs.

Figure 4:
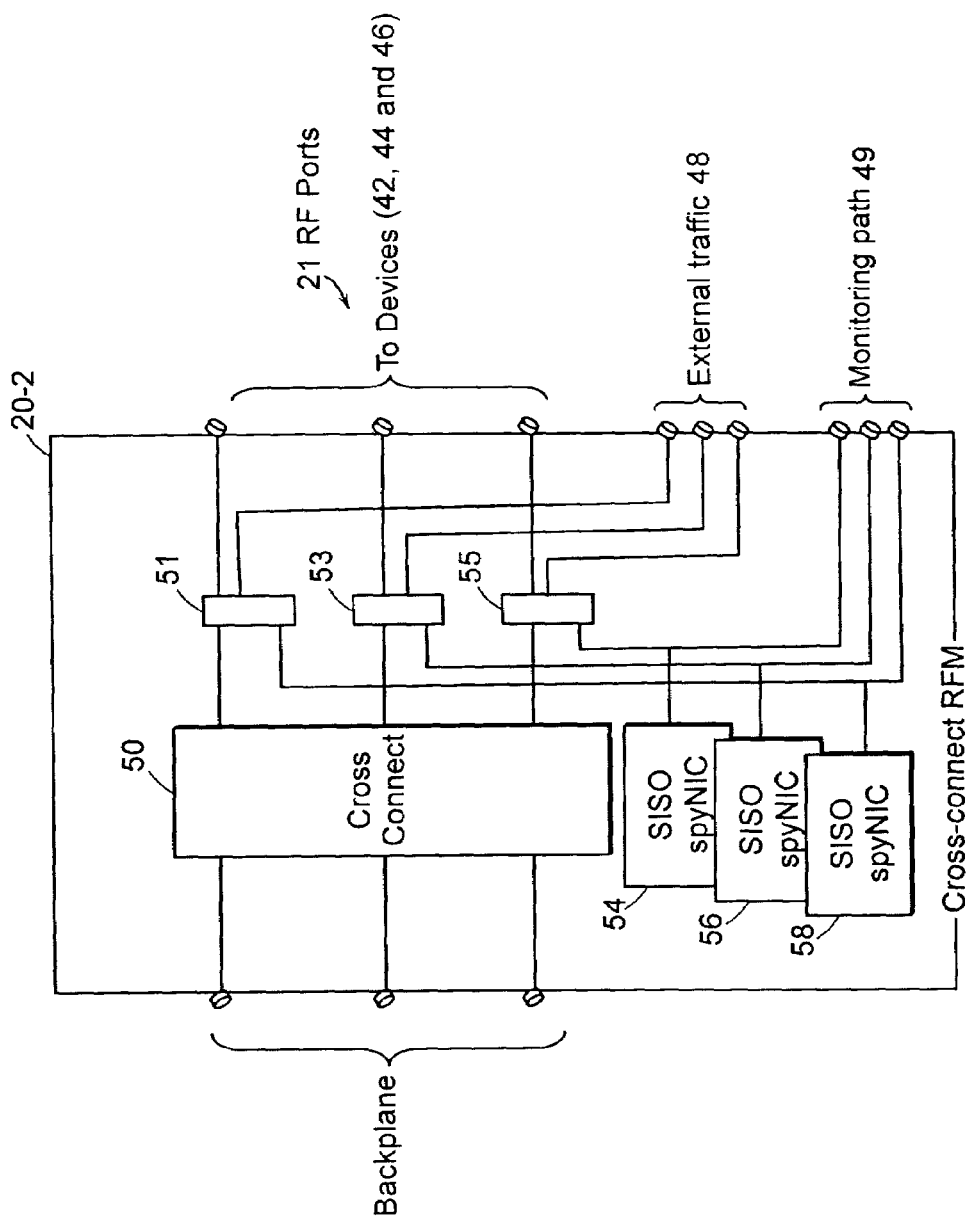
FIG. 4 is a block diagram of illustrating exemplary components that may be included in a cross-connect channel emulation module.

FIG. 4 illustrates exemplary components that may be included in a cross connect channel emulation module 20-2. The channel emulation module 20-2 includes cross connect logic 50, which is disposed between the backplane and RF ports 21 of the channel emulation module. Taps 51, 53 and 55 are disposed between the cross connect logic 50 and the RF ports 21. The taps 51, 53 and 55 are also coupled to external traffic path 48, and a monitoring path 49. External traffic may be injected into the transmission channel of the DUTs via the cross connect using the external traffic ports 48, for example to test the operation of devices in the presence of a range of background traffic. The monitoring path may be coupled either to an external monitoring device (not shown in this embodiment), or monitoring circuitry 54, 56 and 58 which is disposed within the channel emulation module. The monitoring circuitry includes Network Interface Cards (NICs) which interpret and analyze exchanges between the devices in the transmission channel under test (in this example, devices 42, 44 and 46) and the APs 32, 34 and 36.

Figure 5:
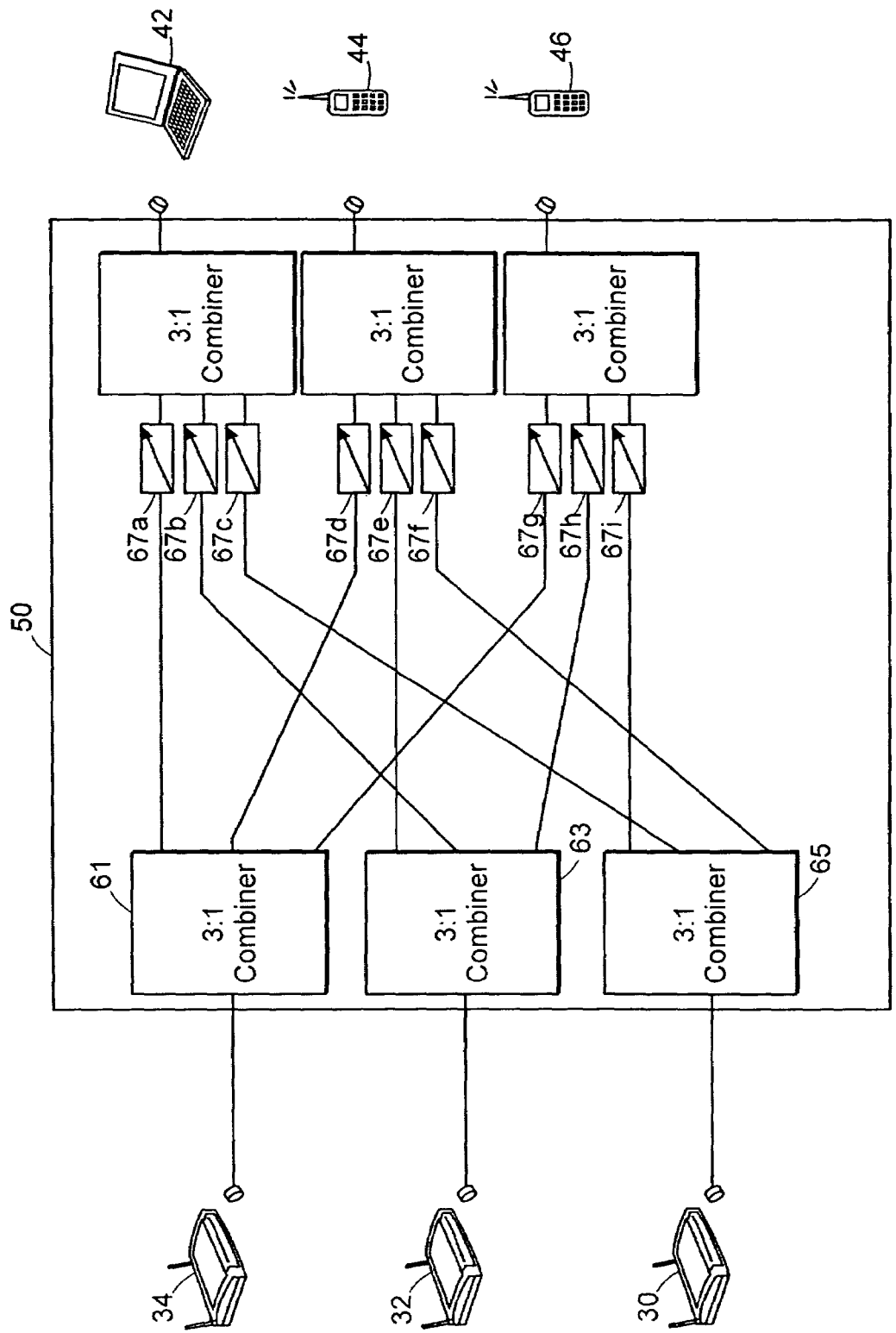
FIG. 5 is a block diagram provided to illustrate one embodiment of cross-connect circuitry that may be included in the cross-connect emulation module of FIG. 4.
Figure 6:
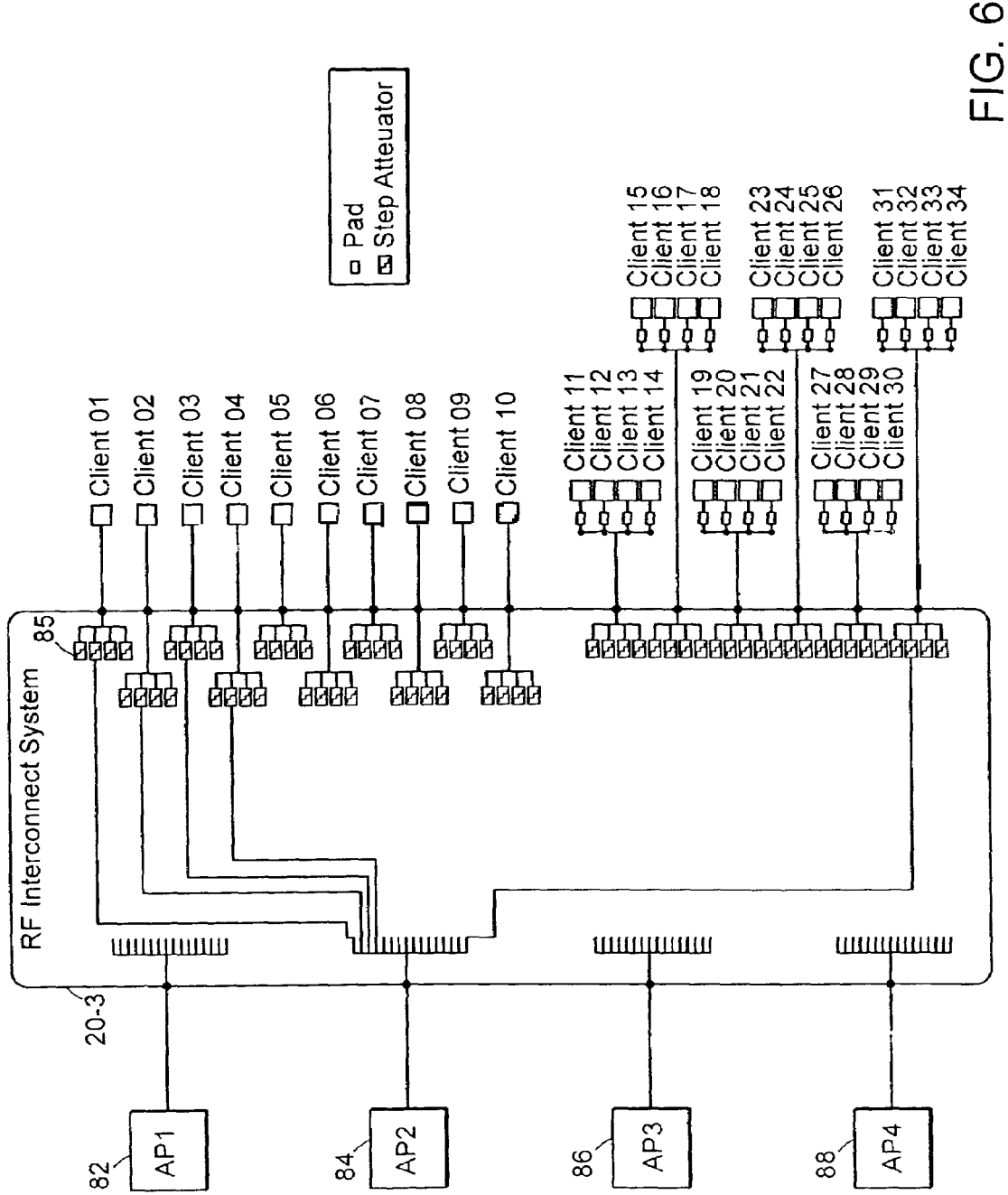
FIG. 6 is a block diagram provided to illustrate another embodiment of cross-connect circuitry that may be included in the cross-connect emulation module of FIG. 4.

FIGS. 4 and 5 have described a channel emulation module which uses a symmetric cross-connect. However, it should be understood that it is not a requirement that the cross-connect be symmetric, and in fact typical network topologies are often asymmetric. For example, an alternative embodiment of a cross-connect channel emulation module 20-3 which may be used to emulate channel effects and connectivity in a network comprised of 4 APs and 16 clients is shown in FIG. 6. Thus the cross-connect channel emulation module can be comprised of any N×M matrix, with attenuation capabilities in each path. Each N×M cross connect would include N 1:M combiners coupled to backplane connectors, M N:1 combiners coupled to test ports of the emulation module, and N×M attenuators disposed between the pairs of combiners.

According to one aspect of the invention, each attenuator in the cross connect is independently programmable, for example, by a software test routine operated by a test administrator. With such an arrangement, the movement of devices in the network may be emulated through appropriate adjustment of attenuation of the signals in the transmission channels. The full connectivity of the cross-connect permits simulation of multi-dimensional movement, thereby enabling a robust analysis of roaming capabilities of the test devices. As has been shown and described, the size and symmetry of the cross-connect is limited only by the practical aspects of its insertion loss.

Multiple Input, Multiple Output Channel Emulation Module

Figure 7:
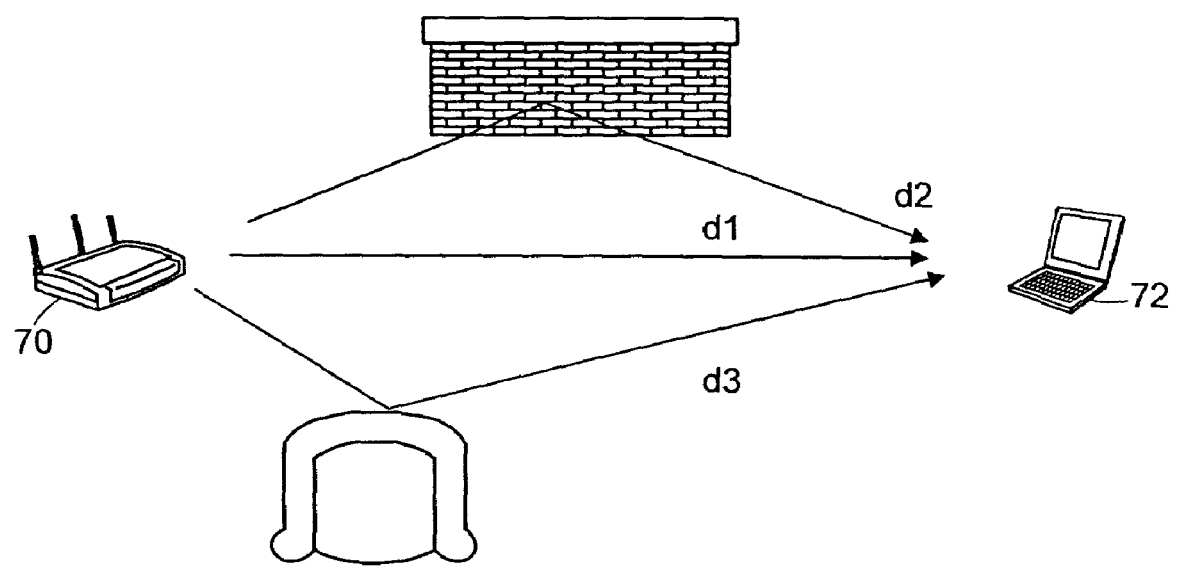
FIG. 7 is a diagram provided for the purposes of illustrating multipath signal propagation.

Referring now to FIG. 7, a discussion of how the architecture of the present invention may be used to facilitate testing of a MIMO environment will now be shown and described. FIG. 7 illustrates the basic phenomenon of multipath signal propagation. Because there are obstacles and reflectors in the wireless propagation channel, the transmitted signal arrivals at the receiver from various directions over a multiplicity of paths. Multipath signals are therefore an unpredictable set of reflections and/or direct waves each with its own degree of attenuation and delay.

The Institute of Electrical & Electronic Engineers (IEEE), a professional organization that helps set transmission system standards, is currently defining IEEE 802.11n™ which seeks to take advantage of the multipath phenomena. In an attempt to increase data throughput over that which is available in 802.11a, b or g, 802.11n endorses using the signal differentiation provided by multipath phenomena to permit radio frequency channel sharing by different data streams.

Multipath channel effects are also considered in transmit beam forming technology. In general, transmit beam forming uses antenna diversity to increase communication quality; i.e., increase the transfer rate vs. range performance. In transmit beam forming, the same data is sent from each antenna, but with a phase/amplitude adjustment for each antenna, such that the signal quality is maximized at the receiver. Beam forming technology thus allows diversity and array gain to be achieved. Protocols and systems which utilize the multipath behavior of transmission signals to their advantage (such as MIMO and beam forming technologies) are referred to herein after as MIMO protocols and systems.

Figure 8:
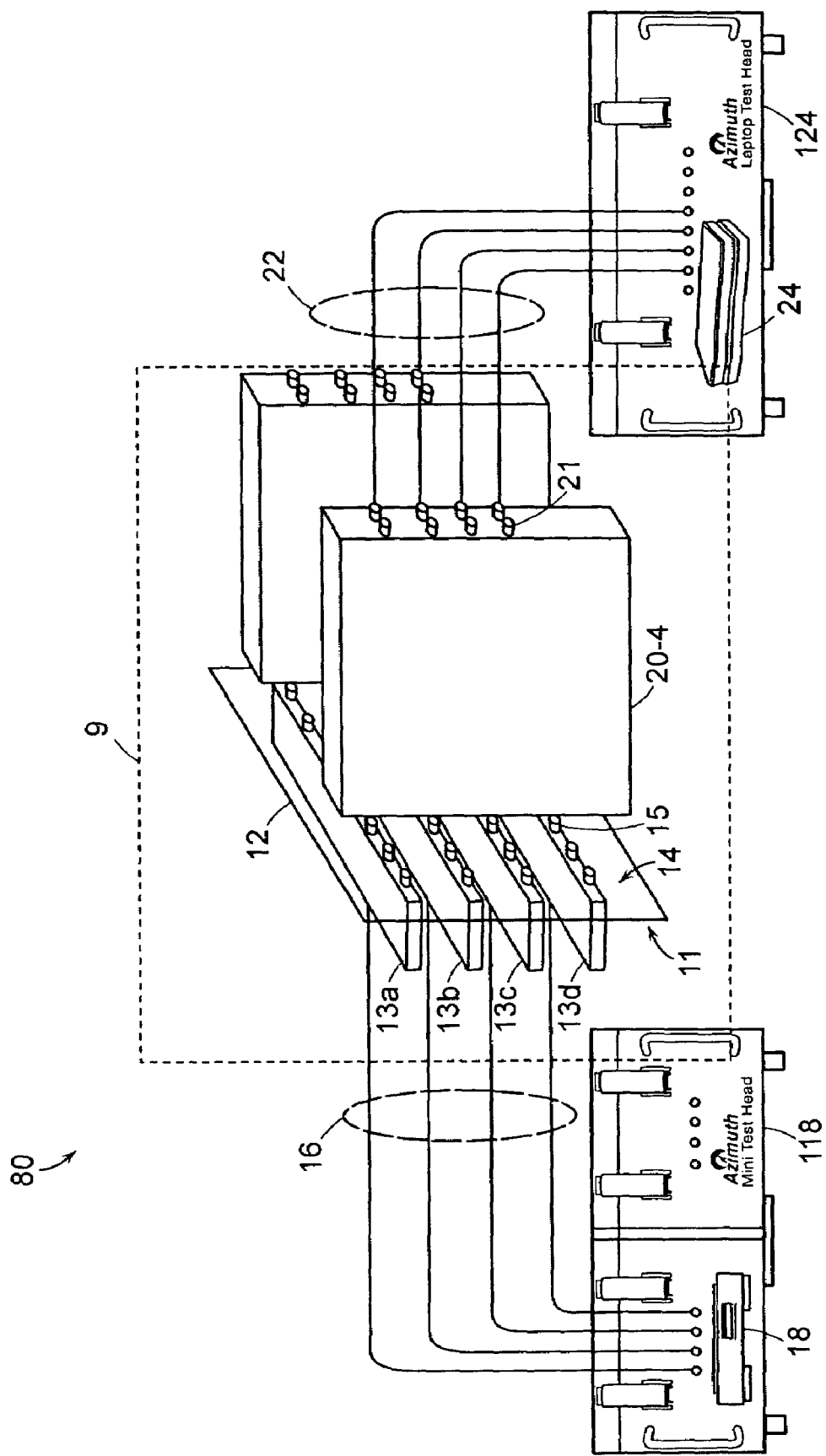
FIG. 8 is a diagram of a test environment in which the test chassis architecture is used to test Multiple Input, Multiple Output (MIMO) devices.
Figure 10:
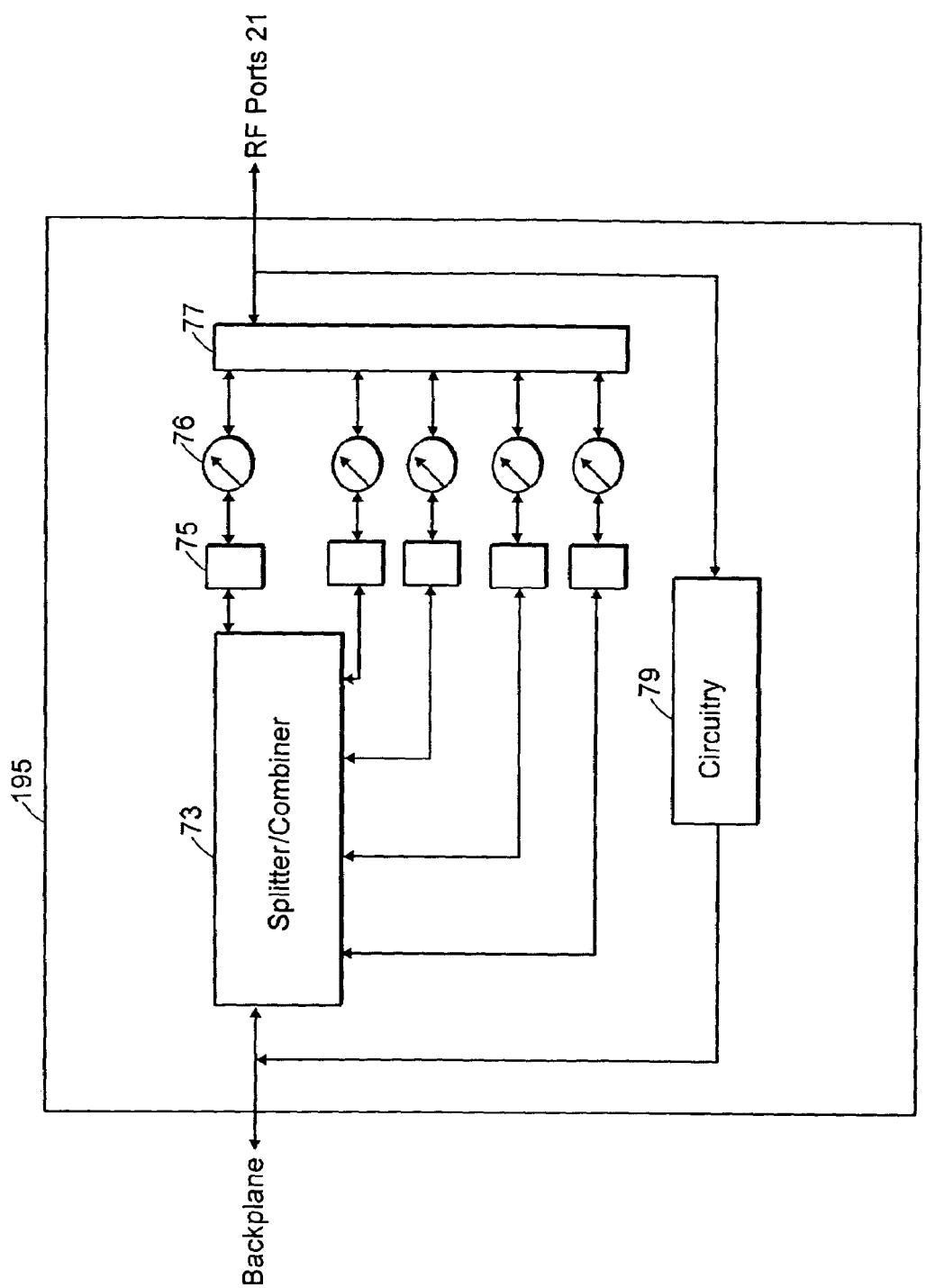
FIG. 10 is a diagram of a first embodiment of channel emulation circuitry which uses analog circuitry to emulate multipath and other channel effects by modifying the signal in the RF domain.

Referring now to FIG. 8, a MIMO access point 18 is coupled via RF combiners 13a-13d to a MIMO channel emulation module 20-4. A MIMO client device, such as laptop 24, is coupled to RF ports 21 of the MIMO channel emulation module 20-4. The MIMO channel emulation module 20-4 includes circuitry for emulating multipath channel effects in addition to other channel effects described above on each of the four signals in the transmission channel shared by the access point 18 and the client 24. The MIMO channel emulation may be implemented using circuitry having a range of complexity; for example, from analog circuitry as shown in FIGS. 3 and 10 to digital signal processing devices, or a combination thereof. Similar to the attenuation and cross-connect emulation modules, the MIMO emulation modules may be adapted to include integrated monitoring functionality, or alternatively may be coupled to external monitoring devices.

In FIG. 8, AP 18 and client laptop 24 are each shown coupled to the backplane and channel emulation module, respectively, via groups of four cables (16 and 22). As mentioned above, the cables are coupled to antenna ports of the respective test devices, and are used to isolate the signals from environmental interference as they are transferred from the test devices to the backplane/channel emulation module. In the MIMO test environment, each RF signal is transmitted at the same frequency. The MIMO channel emulation module adds multipath channel effects, and may be adapted to add one or more of the other channel effects identified above (delay spread, angle of arrival, power angular spread, angle of departure, antenna spacing etc.) to the signals. The channel emulation module controls the range of channel effects that are applied to the multipath signals to test the range of operability of the MIMO devices. The multipath effects that are applied to RF signals may represent expected multipath behavior that is mathematically derived based on intuition and knowledge bases. Alternatively, the applied multipath effects may be obtained through measurement of actual multipath transmission signal behavior using channel sounding techniques. Channel sounding involves measuring RF signal path loss, delays, gains, phase shifts, etc., for an RF signal as it propagates through a physical environment. The measured values can be saved and then used as a channel profile for multipath emulation.

Figure 9:
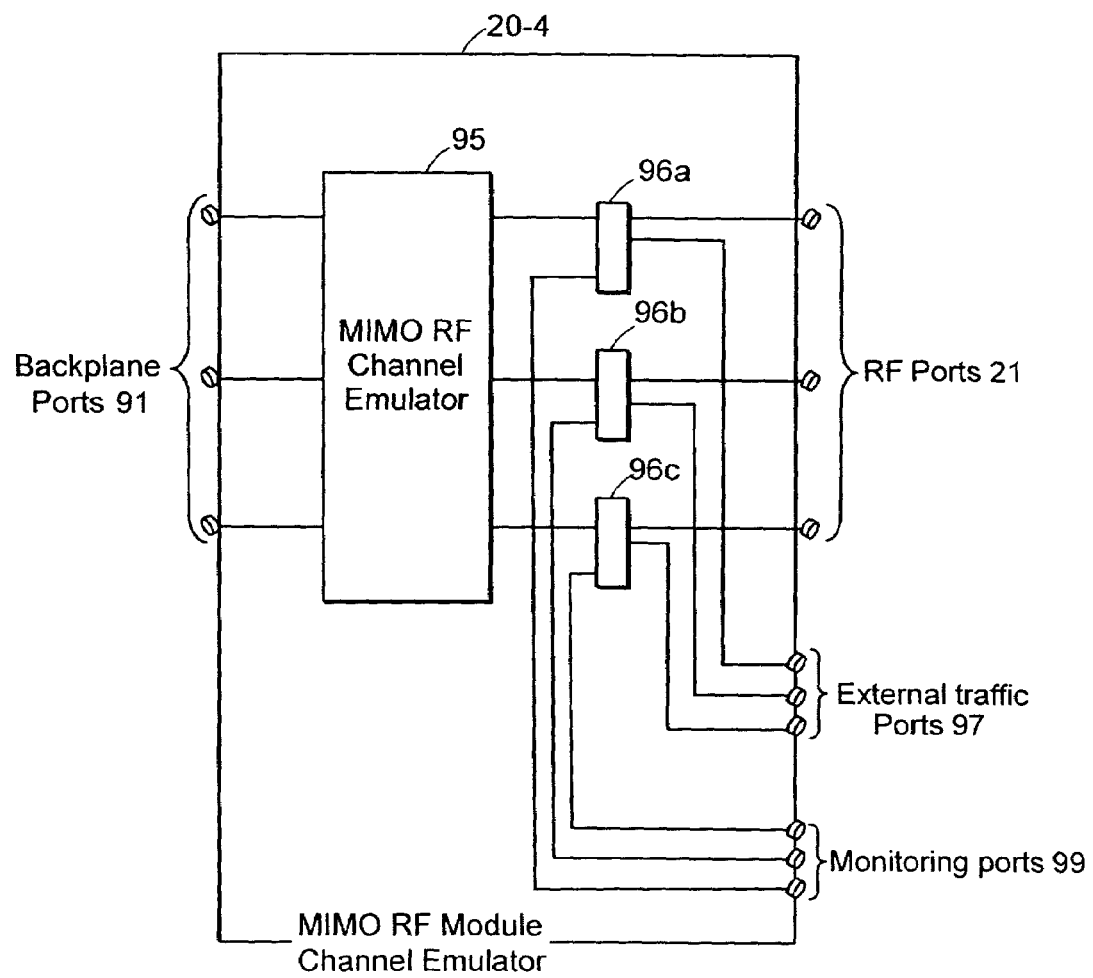
FIG. 9 is a block diagram provided to illustrate several components that may be included in a MIMO channel emulation module.

An exemplary embodiment of a MIMO channel emulation module 20-4 is shown in FIG. 9 to include an RF channel emulation component 95 disposed between backplane ports 91 and RF ports 21. The channel emulation module is also shown to advantageously include external traffic ports 97 and monitoring ports 99. As mentioned above with regard to the cross-connect channel emulation module, external traffic ports 97 may be used to inject background traffic into the transmission channel of the test devices during test. Monitoring ports 99 may be coupled to an external monitor to permit monitoring of DUT behavior. Alternatively, monitoring blocks may be included within the channel emulation module in a manner similar to that illustrated in FIG. 4 of the cross-connect channel emulation module 20-2.

As mentioned above, emulation of multipath channel behavior may be performed at a variety of complexities, and thus the RF channel emulator component 95 may comprise an associated variety of circuitry of various complexities. FIG. 3, previously described, illustrated a low complexity circuitry which may be included in the RF channel emulator component 95, wherein path loss is introduced on the signals using attenuators for testing MAC and higher level protocols. Several other embodiments of RF channel emulator components (195, 295, 395 and 495 in FIGS. 10-13 respectively) which may be used to emulate multipath channel effects at a variety of complexities will now be shown and described. It should be appreciated that the disclosed embodiments are exemplary only, and the present invention encompasses any technique that may be substituted herein for emulating multi path channel behavior. For example, channel emulator components 195 and 295 may replace the digital signal processor 232 in FIGS. 12 and 13 to provide a bi-directional analog multipath emulator.

Referring now to FIG. 10, an illustration a first analog embodiment 195 of the channel emulator component is shown. The channel emulator 195 adds channel effects to the bidirectional signals exchanged between the backplane and the RF ports 21 of the channel emulator module. For purposes only of facilitating understanding of the below description, the term 'forward' path shall be used to describe transmissions on a path originating at the backplane and ending at the RF Ports 21, and the term 'reverse path' will be used to describe transmissions on a path originating at the RF Ports 21 and directed at the backplane. The illustrated embodiment shows circuitry that may be included to add multipath to each one of N paths included in an N×M multipath transmission channel under test. The RF channel emulator 195 includes a splitter/combiner 73 coupled to a plurality of delay lines 75 and a plurality of programmable attenuators 76. The delay lines are coupled to a splitter/combiner 77. The delay lines may be fixed or programmable analog devices which add delay to N versions of the backplane signal. Signals from the backplane are differently delayed, attenuated and combined at combiner 77 and forwarded to the RF ports 21. Signals from RF ports 21 are similarly attenuated and delayed before being combined at combiner 73 for forwarding to the backplane.

Figure 11:
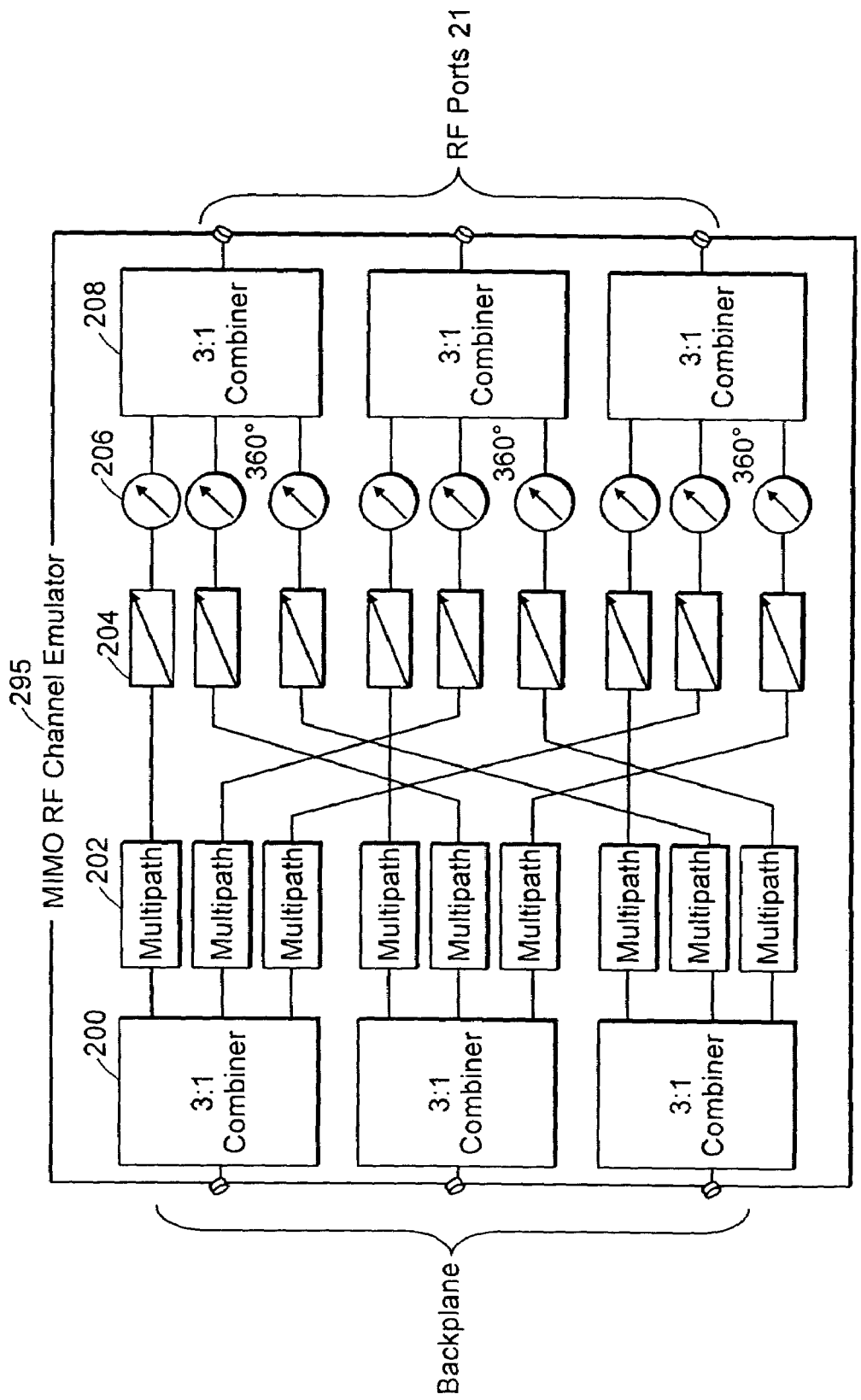
FIG. 11 is a diagram of a second embodiment of channel emulation circuitry which uses analog circuitry to emulate multipath and other channel effects, by modifying the signal in the RF domain.

FIG. 11 illustrates an alternate embodiment of an analog channel emulator 295. The channel emulator 295 is shown to include a first set of combiners 200, a second set of combiners 208 and a set of attenuators 204 and phase shifters 206 disposed there between. In addition, the channel emulator is shown to include a multipath block 202. Each multipath block adds a potentially different multipath effect to the signal, for example using circuitry similar to that of FIG. 10. The signals with multipath effects are forwarded to attenuators 204, where programmable path loss may be applied to the signals according to a desired simulated behavior. The attenuated multipath-affected signals may be phase-adjusted by phase shifters 206, for example to test behavior of ODFM transceivers or other types of transceivers and modems.

Figure 12:
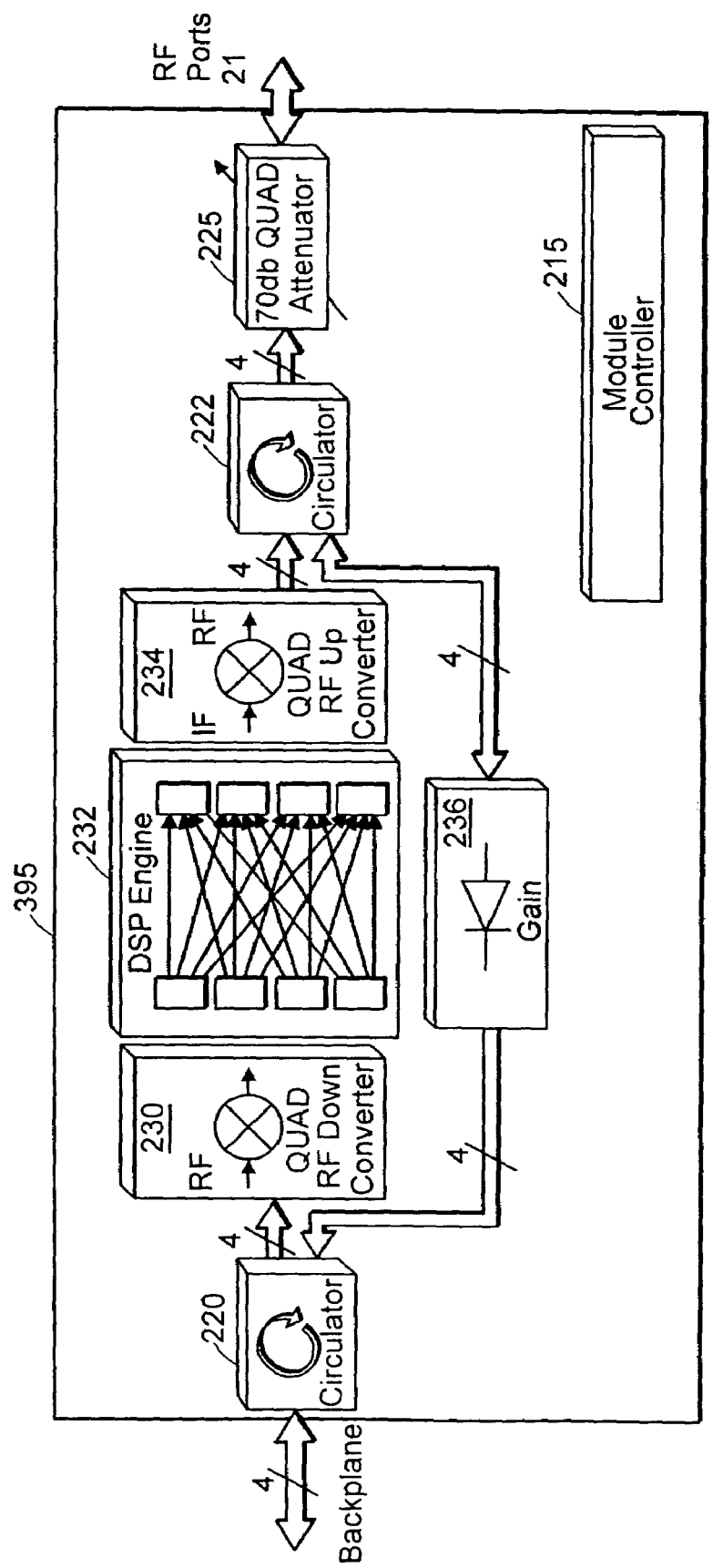
FIG. 12 is a diagram of a third embodiment of channel emulation circuitry which uses a digital signal processor for emulating multipath and other channel effects.
Figure 13:
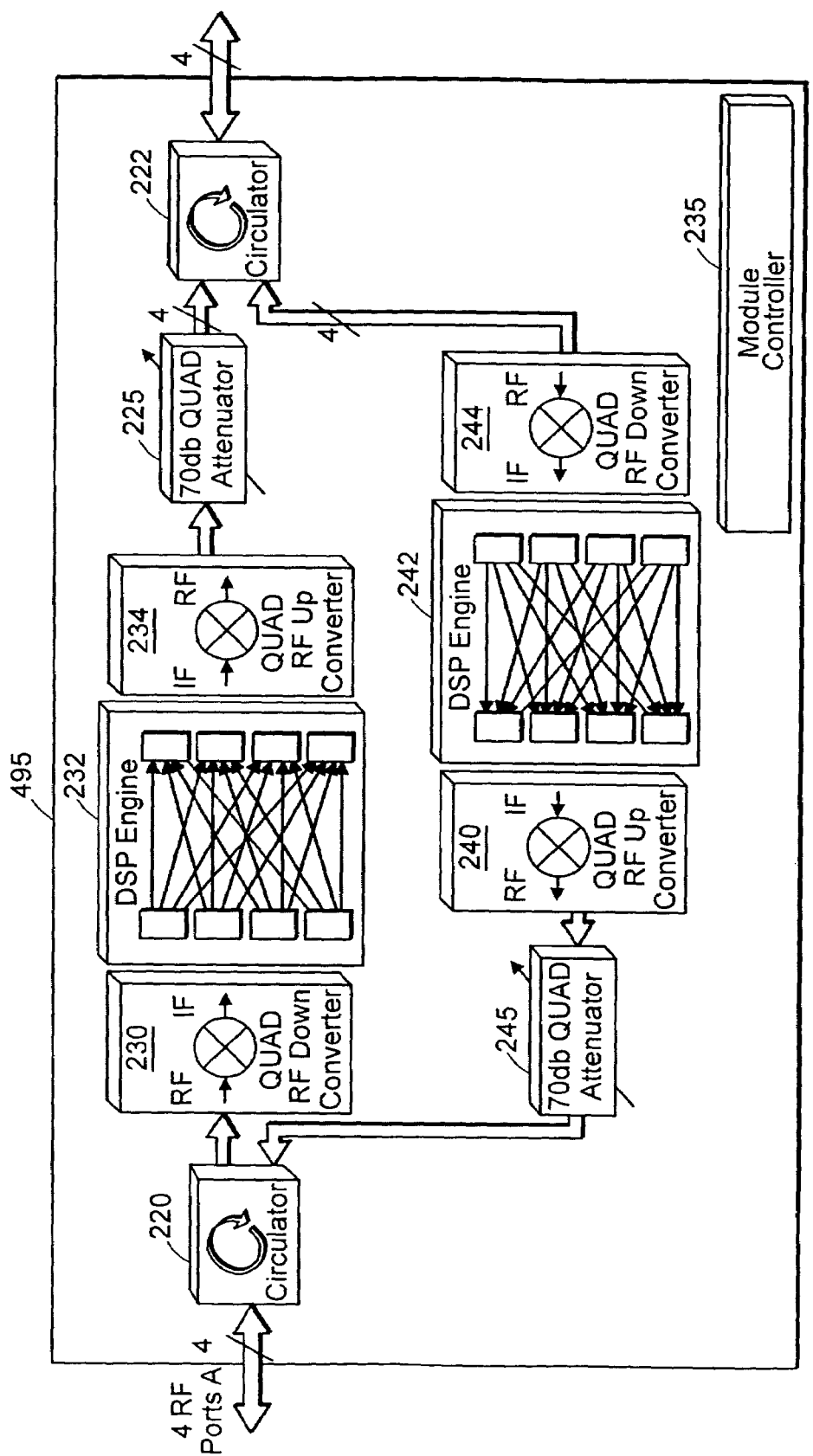
FIG. 13 is a diagram of a fourth embodiment of the multipath channel emulation circuitry, including a return transmission path having multipath effects added to return signals in the IF domain.

Because it is sometimes difficult to manipulate high frequency signals, it may be desirable to down-convert the RF signal to IF before using the analog circuitry illustrated in FIGS. 10 and 11. Down-converted signals may be passed to analog circuitry, such as the channel emulator components 195 and 295 of FIGS. 10 and 11, or alternatively a digital signal processor such as DSP 232 shown in FIGS. 12 and 13. FIG. 12 illustrates a uni-directional multipath emulation circuit 395, while FIG. 13 illustrates a bi-direction multipath emulation circuit 495. Both MIMO emulators assume a four signal RF interface. Note that both FIGS. 12 and 13 show reverse path circuitry which is not necessary if the bi-directional components 195 and 295 are substituted therein.

In FIG. 12, RF ports of the backplane are coupled to a circulator 220. RF signals from the backplane are forwarded to a Quad RF down converter 230. The quad RF down converter converts the transmitted RF signals to Intermediate Frequency (IF) or baseband signals for processing by DSP engine 232. The DSP engine processes the input signals by applying multipath and other desired channel effects to each of the input signals according to pre-programmed multipath channel profiles. The modified signals are up-converted to RF, and attenuation is applied at attenuator 225. The modified RF signal travels through a circulator 222 to the RF Ports 21.

The circulator also forwards RF signals received from RF Ports 21 to any reverse path circuitry 236. As mentioned above, the reverse path circuitry may differ in the complexity from the circuitry used to generate a forward path channel effect. For example, FIG. 12 illustrates the inclusion of an amplifier in the reverse path to add gain to the signal before forwarding to the backplane. Module controller 215 controls the application of specific behavior models and attenuation to the multipath signals.

Referring now to FIG. 13, an embodiment 495 of an RF channel emulator is shown wherein the reverse path circuitry is similar to the forward path circuitry described in FIG. 12. Thus in the reverse path a second RF to IF down converter 244 is provided for converting received RF signals from circulator 222 to the mixer that down-converts the RF signal to IF, a DSP engine 242, an IF to RF up-converter 240 and programmable attenuation 245. DSP engine 242 and attenuation 245 are independently programmable and thereby allow different characteristics to be modeled on the return path.

Figure 14:
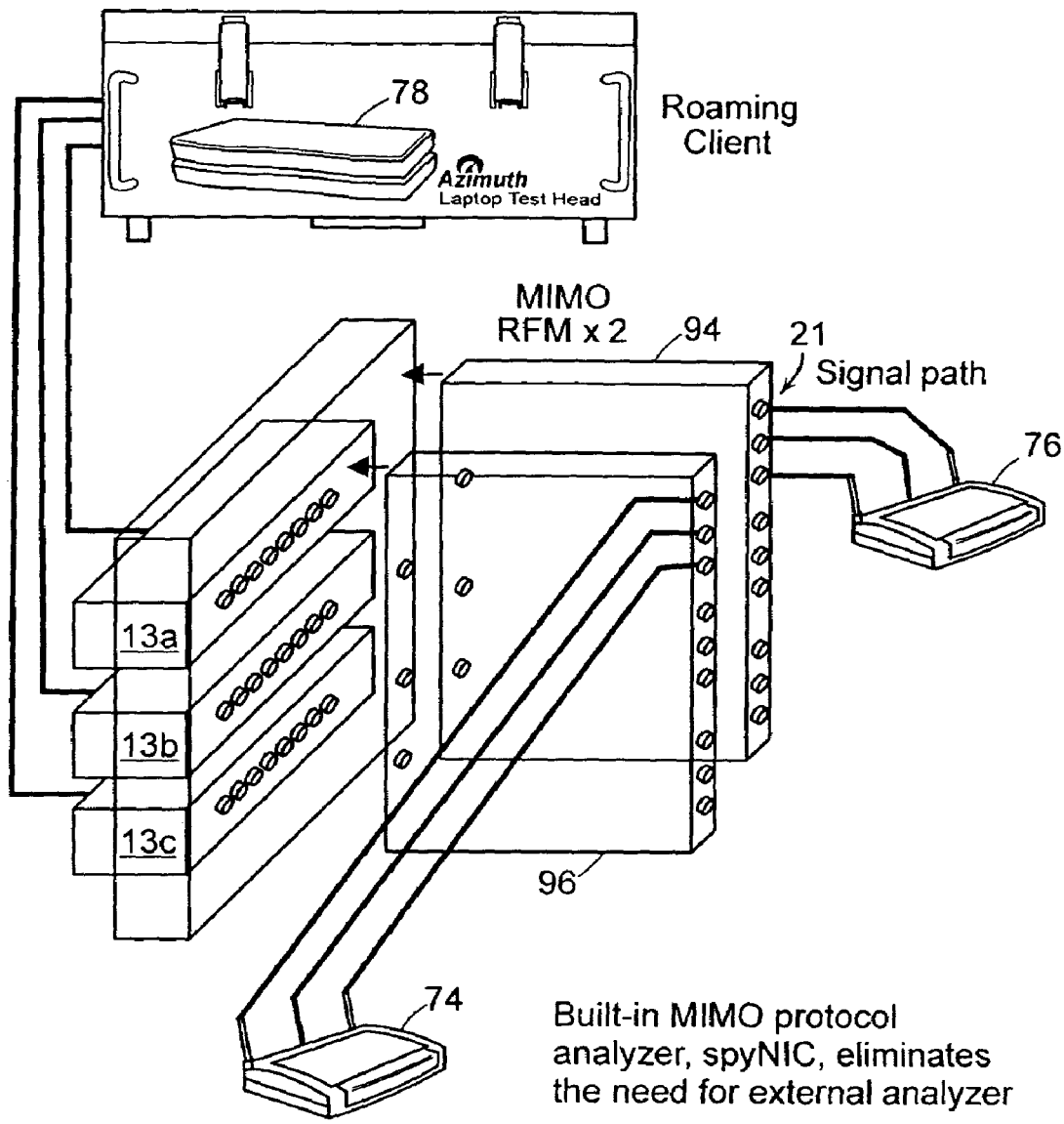
FIG. 14 is a diagram illustrating a multipath test environment configuration for use in analyzing roaming behavior of a MIMO device.

One example of how the MIMO channel emulation modules may be used in a test environment is shown in FIG. 14. In FIG. 14 the test bed includes two MIMO channel emulation modules 94 and 96. MIMO access point DUT antenna ports are coupled to the RF ports of each of the modules 94, and 96, and a MIMO client DUT 78 is coupled to RF combiners 13a-13c. A variety of channel effects, including multipath, path-loss, gain, etc. are applied to signals transferred between the DUTs in accordance with a desired test suite. For example, the test system may be used to monitor a roaming behavior of the client in response to the emulation of different channel effects in the channel emulation modules.

Accordingly, a modular architecture has been shown and described which may be used to test a wide variety of network topologies and protocols using an arbitrary number of wireless devices. It is recognized that there is a cost associated with maintaining an inventory of wireless products merely for purposes of testing; the cost of populating a test environment for use in verifying the operation of increasingly complex and capable devices in the presence of traffic from multiple devices can become prohibitive. In order to ensure that exhaustive and robust testing can be provided for wireless devices of increasingly complexity, a test module of the present invention may be incorporated into the modular test environment.

Figure 15A:
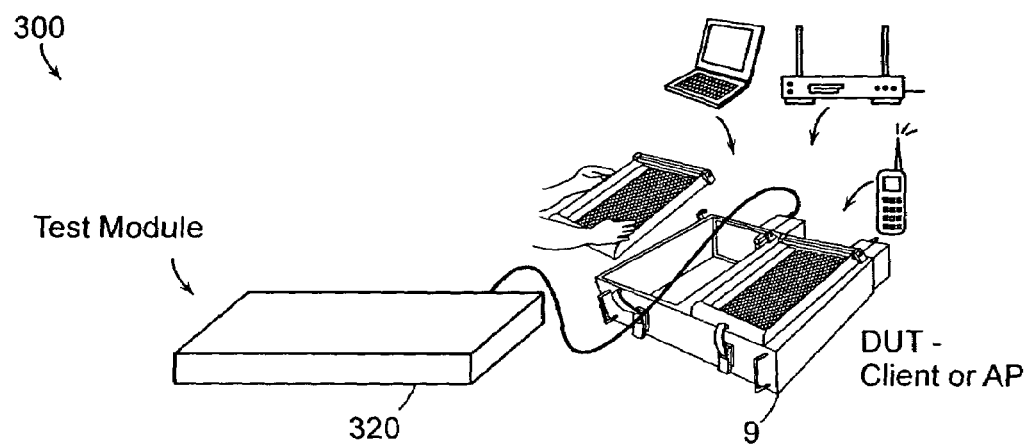
FIG. 15a is a diagram illustrating the coupling of a DUT to a stand-alone test module.
Figure 15B:
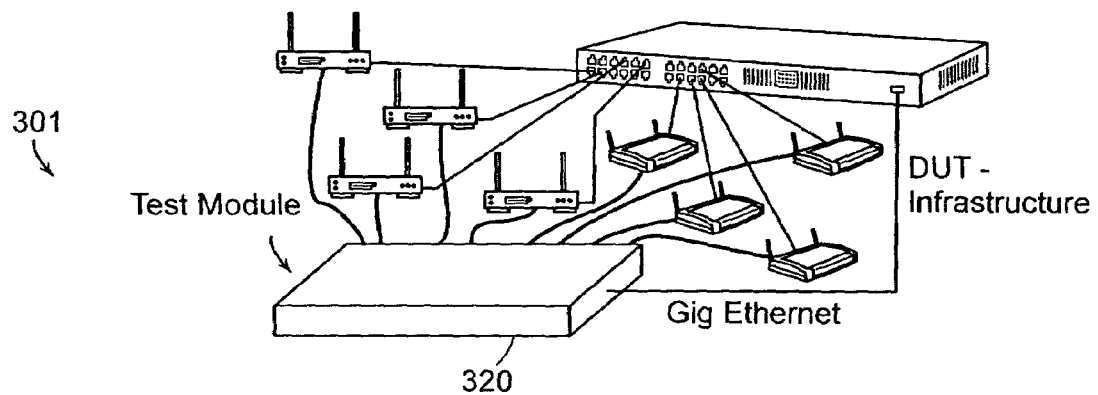
FIG. 15b is a diagram illustrating the coupling of a network of DUTs to a stand-alone test module.

The test module may be used in conjunction with a test chassis such as those described in FIGS. 1-14. In addition, the test module can be directly coupled to DUTs without use of the chassis. Two such test environments 300 and 301 are shown in FIGS. 15a and 15b. The test module is shown stand-alone in both FIGS. 15a and 15b. FIG. 15a shows a client DUT while 15b shows an infrastructure system under test. FIG. 15a shows DUTs inside the shielded test head. FIG. 15b does not show the test head but assumes that DUTs are in test heads for isolation.

The test module 320 in one embodiment is a performance and protocol test platform, programmable to test a variety of network protocols, including but not limited to 802.11a,b,g,n devices and systems. The test module combines client and AP emulation capabilities with a flexible protocol test automation environment to enable thorough testing of device and system behavior for both SISO and MIMO SUTs in the presence of emulated network traffic and fault conditions. Each test module advantageously includes multiple network interfaces. Each network interface can be programmed to perform any one of a variety of functions, including monitoring and analyzing traffic on a channel, emulating one or more AP or client traffic generating devices, or executing test scripts. The test module includes the ability to simultaneously generate traffic at both RF and Ethernet interfaces.

Figure 16:
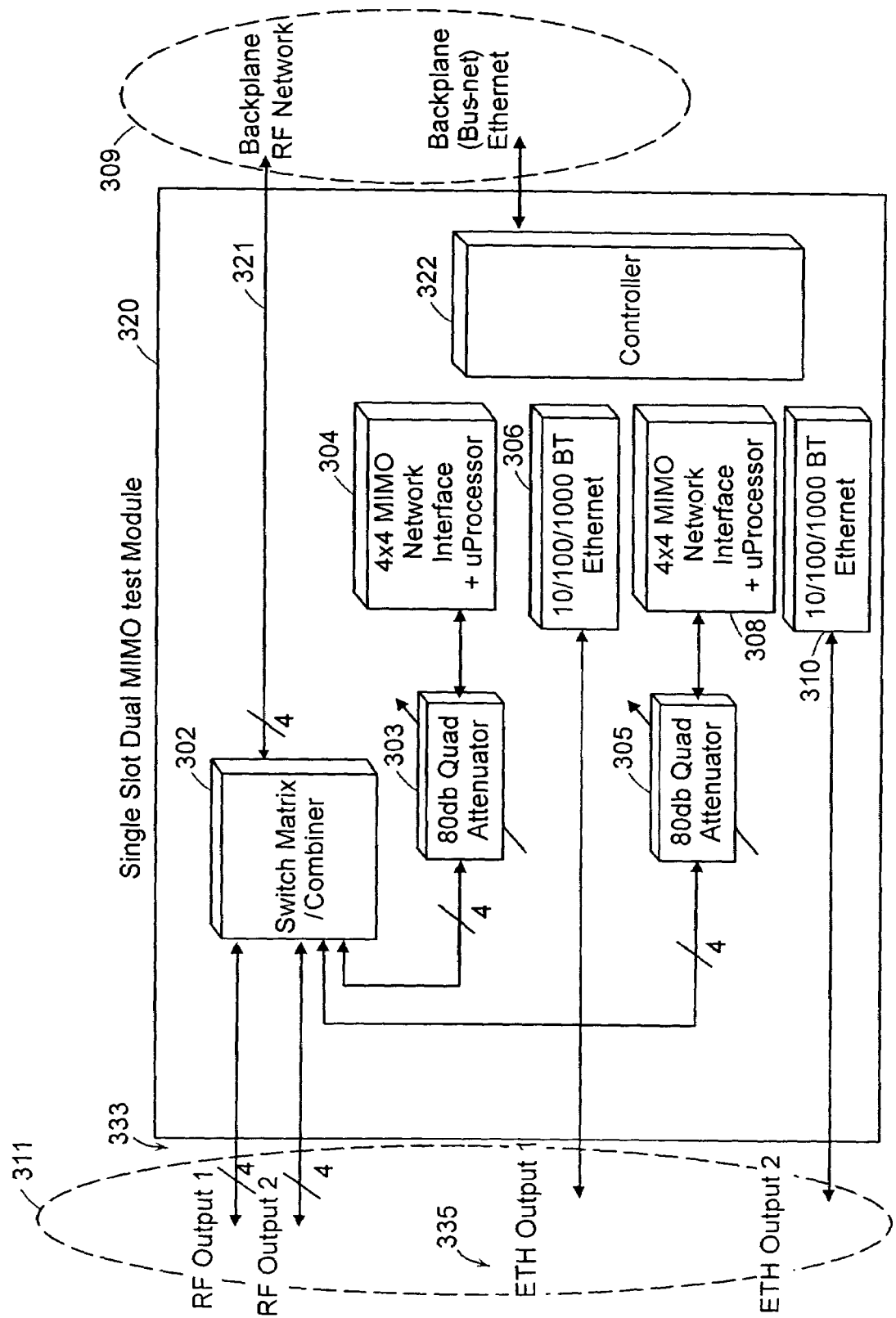
FIG. 16 is a block diagram of several exemplary components that may be included in a test module of the present invention.

FIG. 16 illustrates several components that may be included in an embodiment of a test module 320. The test module also includes a device interface 311 and a chassis interface 309. Network interface blocks 304 and 308 are used to transmit and receive traffic on the RF interfaces, while network interface blocks 306 and 310 transmit and receive traffic on the Ethernet interfaces of the network module. Thus each network interface block includes functionality for transmitting and receiving data as either an 802.3 or 802.11 device. In addition, each wireless network interface advantageously includes circuitry for emulating channel effects on transmitted traffic, wherein the channel effects that are added to the traffic include any of those described above, including path loss, gain, fading, angle of arrival, angle of departure, phase adjustment and multipath channel effects.

A processor subsystem may be included within a network interface block for controlling that network interface, such as shown in network interface blocks 304 and 308. Alternatively, a processor subsystem may be provided external to the network interface blocks, with the processor subsystem controlling one or more network interfaces, each of which may operate using common or different network protocols. For example, in FIG. 16, processor subsystems in blocks 304 and 308 also control the respective Ethernet network interfaces 306 and 310. Thus, although the processor subsystem is shown integrated with the network interface in FIG. 16, embodiments of the present invention may use any combination of microprocessors, located internally or externally with the network interfaces, each controlling one or more different interfaces, and the present invention is not limited in any manner to a particular placement of processing systems.

In the embodiment of FIG. 16, a Controller 322 is also provided. Various tasks that are undertaken during test; such as the generation and analysis of traffic, may be apportioned between the controller and the processors as deemed appropriate by the test administrator. In one embodiment, the Controller may also implement a state machine interpreter that enables creation of software to implement protocol test state machines. Switch matrix/combiner 302 controls the flow of traffic between the RF ports of the network module.

Figure 17:
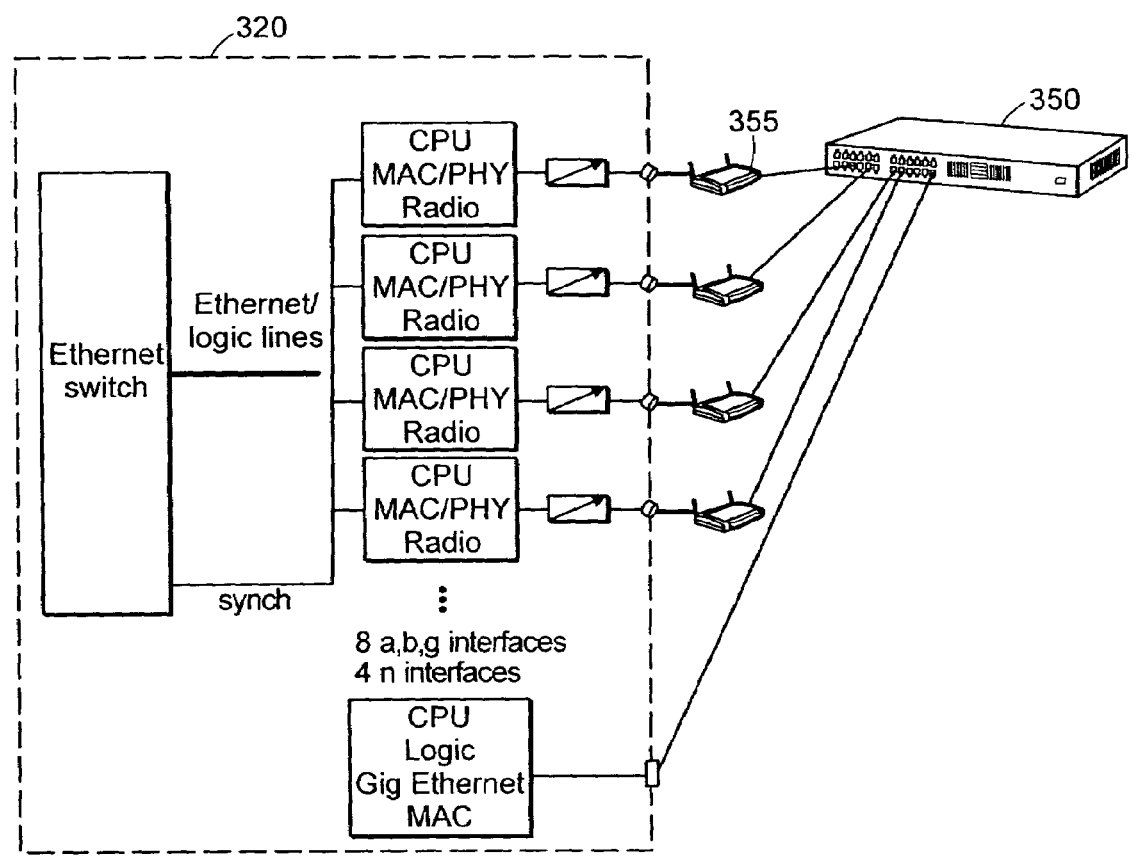
FIG. 17 is a diagram provided to illustrating an infrastructure test configuration using the test module of the present invention.

The components of the test module 320 may be used to support a variety of test configurations. For example, they may be used to generate traffic on multiple APs simultaneously while measuring aggregate throughput of the system. Such a test configuration is shown in FIG. 17, where bi-directional multi-station traffic is used to measure throughput and capacity of the infrastructure. In one embodiment, the test module is capable of emulating traffic from up to 127 simulated clients on each interface, driving up to 8 APs simultaneously. Traffic is generated and analyzed by all the 802.11 and gigabit Ethernet interfaces. The test configuration of FIG. 17 may also be used to emulate roaming of the clients from one AP to another. A fast roaming protocol, or one using pre-authentication may be implemented as part of this roaming emulation to test the APs' ability to support fast roaming based on 802.11r.

Figure 18:
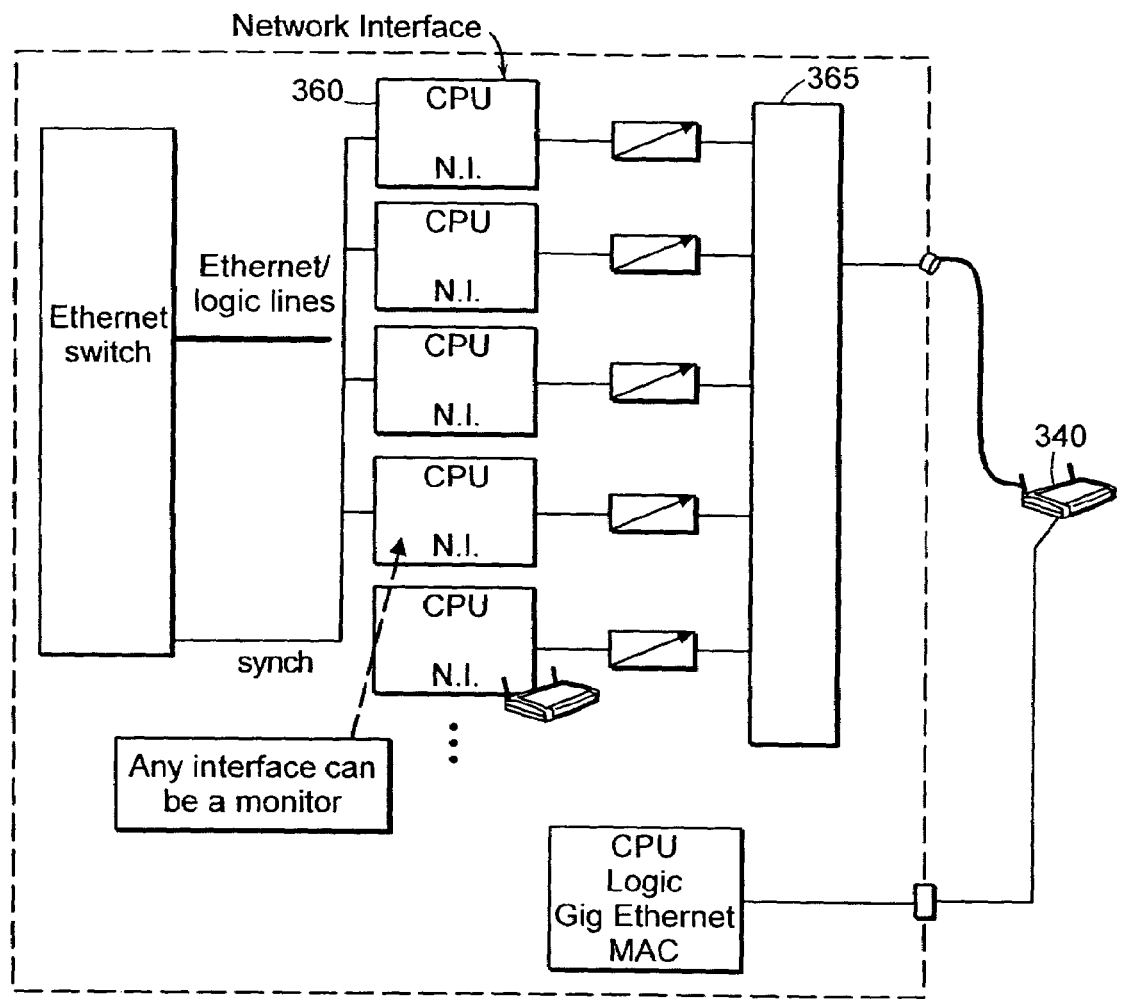
FIG. 18 is a diagram provided to illustrate the use of a test module for verifying operation of an access point device.

In addition, traffic generated by the test module may incorporate multiple network interface entities to create contention among emulated devices for a realistic, emulation of random network dynamics. Such a configuration is illustrated in FIG. 18, where traffic is exchanged with the AP 340 over both Ethernet and RF interfaces. The test module is shown to include a combiner 365, which combines transmissions from the network interfaces and the ports of the test module. The combination of signals will cause collisions on the multiple ports, thereby increasing the reality of the test environment and thus the robustness of the test. The test module then measures performance parameters such as throughput, packet loss, delay, jitter, capacity, association performance, and other properties of the access point in the presence of network traffic.

In one embodiment, each network interface block may be dynamically programmed to assume one of at least 3 different modes—Client emulator, AP emulator, protocol analyzer, or other functions. FIG. 17 illustrates a test module embodiment wherein each network interface block includes a CPU, and wherein one of the N.I. blocks is programmed as a monitor, and is used to monitor transmissions in the transmission channel. A test module may be programmed to support either a SISO or MIMO environment. In one embodiment of client emulator mode, the network interface block includes capability for emulating up to 127 soft clients, for example including but not limited to data, voice or video devices, implement Power-save and Radio Resource Management (RRM), and support 802.11i,e,k protocols. Each client and access point emulator can generate its own transmit streams appropriate for the test at hand.

In addition to client and AP emulation, each network interface block in the test module may be programmed using scripts to perform desired protocol, performance, interoperability or other testing. Programming of the interface blocks may be performed using a known scripting language, such as TCL. Certain interfaces may be dedicated to transmitting and others to receiving to achieve maximum loading of the device under test while at the same time monitoring the, progress of the test with no frame loss. Thus the particular functionality performed at any given time by each network interface is a matter of test configuration, and will vary depending upon the particular protocols and capabilities being tested.

General test capabilities that may be included in each test module include the capability to test both client and AP devices, alone or as a networked system, as well as functionality for analyzing test device throughput, capacity, roaming abilities, and range and protocol conformance. It may be desirable to include certain circuitry and program code in the test module in order to ensure that the general test capabilities can be supported. For example, for some performance and behavioral testing it is desirable to synchronize transmissions with other controls (e.g. attenuator settings). The controller 322 assists synchronization circuitry with scheduling of multi-client transmissions at desired resolutions. As described in the Mlinarsky patent, the synchronization circuitry is advantageously disposed in the chassis of a test system to provide a sync signal to each component to resynchronize a clock internal to each system chassis to a specific, high precision value.

For accurate throughput determinations, in order to measure how much of the offered test traffic is properly forwarded by a test device, statistical analysis should be performed at the same time as traffic generation. One way to implement concurrent statistical analysis is to analyze traffic on the 802.11 and Ethernet interfaces simultaneously with traffic generation on both of these interfaces. The traffic analysis and generation should support the fastest theoretical frame rate and throughput.

For delay and jitter measurement, the test module should include circuitry for inserting a time; stamp into a transmit frame as part of the data field. Once the timestamp is inserted, the frame should to be transmitted onto the medium with a deterministic delay. Receive frames must likewise be marked with a deterministic timestamp (e.g. in a buffer descriptor). For transmissions where it is difficult to insert a time-stamp just before frame transmission due to queuing issues; each transmit frame may be recorded and matched with a receive frame to calculate the delay through the DUT or SUT. In order to test the roaming performance and functionality of the AP, the test module needs to implement the client roaming algorithm that supports the latest standards associated with fast roaming. In one embodiment, the test module is programmed using a command line or scripting interface.

Another feature of the test module is its ability to capture and decode traffic on both 802.11 and 802.3 interfaces simultaneously, thereby allowing the test module to determine protocol compliance and measure various performance parameters (frame forwarding rate, roaming time, etc.).

Latency Measurement

According to another aspect of the invention, the test module may include latency measurement circuitry to characterize latency of a DUT, where the DUT may be an AP or other infrastructure device. The latency is defined as the time difference between when a frame is received at one network interface of a DUT and transmitted out of another network interface of the DUT.

Typical prior art latency measurement methods insert a first time stamp into a frame transmitted by a test module on a first network interface to the DUT. A second timestamp is added to the frame when it is received from the DUT at the test module. DUT latency is calculated using the delta between the transmit and receive timestamps. However, access to the network is non-deterministic; frame buffering and priority scheduling cause indefinite delays between the time when the frames receive their time stamps, and when transmission actually occurs.

The present invention overcomes the problems of the prior art by monitoring frames transmitted from the network interface of the test module to the DUT, extracting sequence number from each transmitted frame, and storing, with the sequence numbers, a time stamp representing the time the frame was actually transmitted from the network interface. Programmable logic, such as a Field Programmable Gate Array (FPGA) inserts time stamps into frames as they are received at the test module. The latency of the DUT can be computed by identifying transmitted and received frames having a common sequence number, and determining the delta between the transmitted time stamp and the received time stamp. Because the time stamps reflect the time at which the frame was actually transmitted and received by the network interfaces, it removes the nondeterministic attributes from latency measurement, and provides a DUT latency measurement having improved accuracy.

Figure 20:
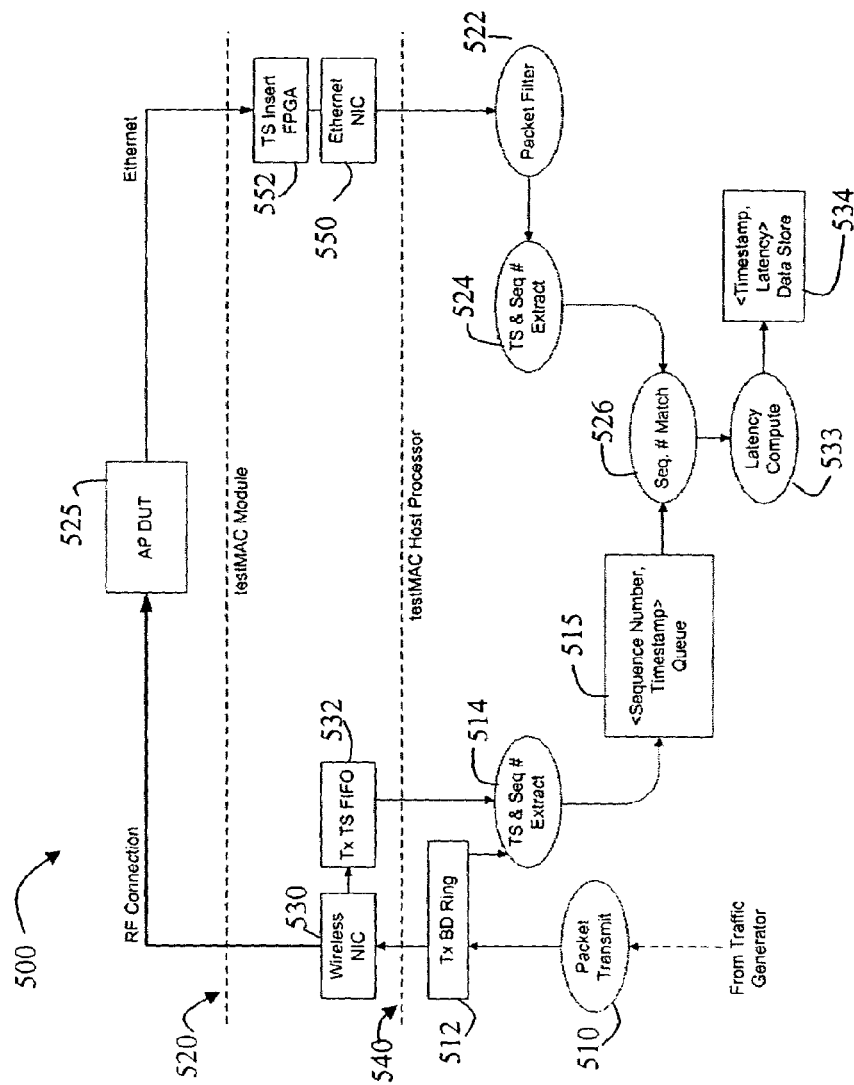
FIG. 20 is a data flow diagram provided to illustrate a method and system for measuring the latency between an RF interface and Ethernet Interface of a DUT.

FIG. 20 is a functional flow diagram provided to illustrate exemplary steps that may be performed during latency measurement, by exemplary functional blocks of the test module. It should be noted that the functional blocks are representative only, and are used generally to describe different components that may be included in a test module to perform latency measurement. Although many of the blocks are referred to below as processes, it should be understood that the functional blocks may be implemented in software, hardware, or a combination thereof. The process functionality may be implemented by any of the processors of the test module, including processors both integrated with or external to the network interfaces.

FIG. 20 illustrates the use of the functional components to measure latency from a wireless interface to an Ethernet interface of a DUT 525. Packets are generated by a traffic generation process (not shown) and passed to the Packet Transmit process 510 which places them in the wireless NIC transmit buffer descriptor ring 512. The Timestamp and Sequence Number Extract process 514 is executed as part of a transmit completion interrupt. It performs the necessary operations to pair up the sequence number contained in a field in all transmitted packets with a timestamp read from the Transmit Timestamp FIFO 532. The output of this process is placed into a queue 515 to wait for the same packet to be received on the Ethernet interface.

A packet that was successfully transmitted by the wireless NIC, received by the AP and forwarded to the Ethernet side of the AP will be received by the Timestamp Insert FPGA 552. This FPGA 552 inserts a timestamp into a field in the packet intended for this purpose. The TS Insert FPGA 552 performs this operation on the fly and passes the resulting packet to the test module Ethernet NIC 550.

A Packet Filter process 522 receives packets from the Ethernet NIC 550 and determines whether the packet should be part of the latency calculation. For example, Address Resolution Protocol (ARP) packet or some other AP generated packet is would not be included into the latency measurement calculation.

After being approved by the Packet Filter process 522, the packet passes to another Timestamp and Sequence Number Extract process 524. The process reads the receive timestamp and the sequence number from their offsets in the packet, and passes the information to the Sequence Number Match process 526.

The Sequence Number Match process searches for the received sequence number in the <Sequence Number, Timestamp> queue 515. When the correct entry is located, it is passed along with the received timestamp and sequence number to the Latency Compute process 533.

The Latency Compute process converts timestamps to the same units, if necessary, and computes the difference between receive and transmit times to measure the latency. On completion, it stores the transmit time and calculated latency in a data store for later processing or display. In this example of FIG. 20, since the delay measurement is performed between unlike network interfaces that use different time bases, the transmit and receive timestamps cannot be correlated in a straightforward manner. The transmit and receive timebases may drift with respect to one another and this drift must be accounted for when delay through the DUT is computed. To correlate the two timebases the actual drift between these timebases is periodically measured and characterized and taken into account when the time delay through the DUT is computed. Such a drift calibration process typically applies to the cases whenever the timestamps are provided by unlike network interfaces.

The delay measurement described here may advantageously be performed using traffic that emulates a multitude of virtual clients since the delay of an infrastructure device is a function of the number of active clients that pass traffic through this device.

Figure 21:
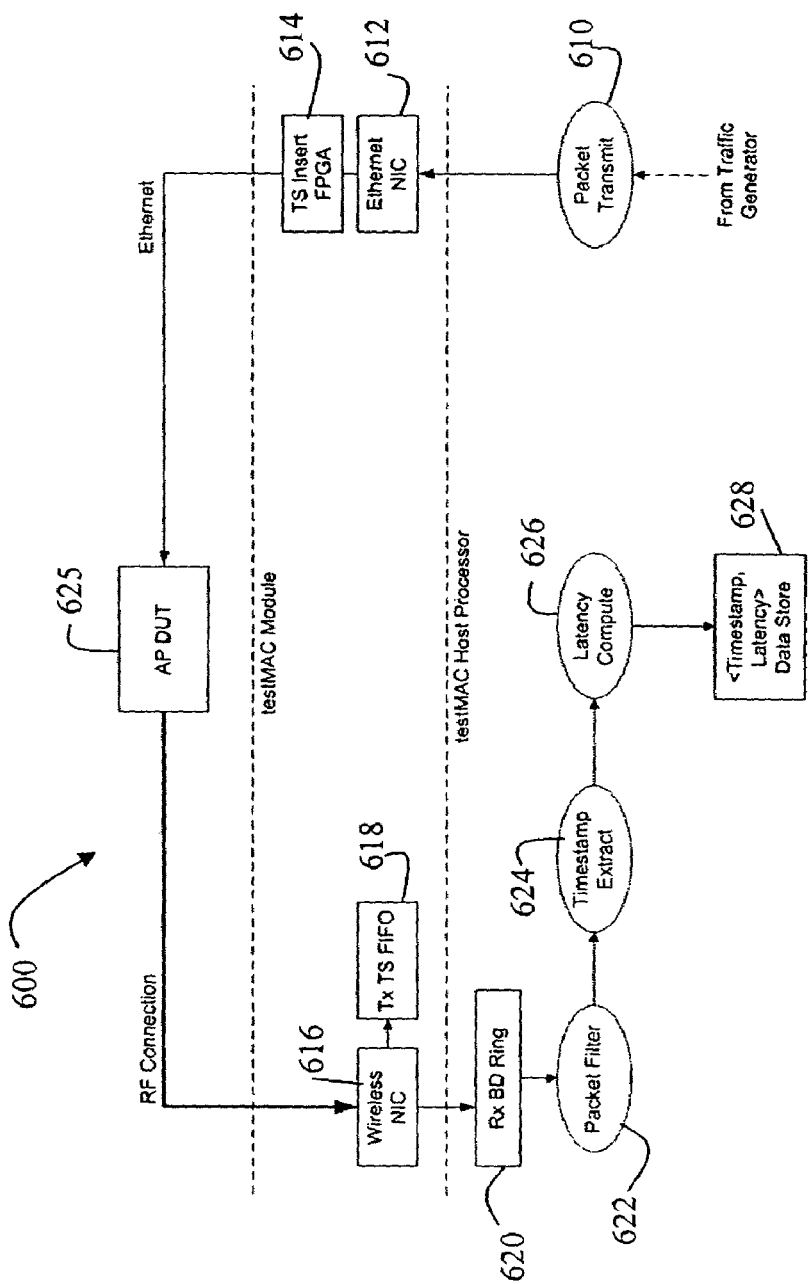
FIG. 21 is a data flow diagram provided to illustrate a method and system for measuring the latency between an Ethernet Interface and RF interface of a DUT.

Referring now to FIG. 21, a data flow diagram is provided to illustrate how the latency measurement method and apparatus of the present invention may be used to measure latency from the Ethernet interface to the RF interface through a DUT 625. As shown in FIG. 21, packets are generated by a traffic generation process (not shown) and passed to the Packet Transmit process 610 which places them in the Ethernet NIC transmit buffer descriptor ring 612 for transmission.

As the Ethernet NIC transmits a packet, the TS Insert FPGA 614 receives the packet and inserts a timestamp in the packet at the appropriate offset from the end. It then retransmits the packet onto the Ethernet whereupon it is received by the AP DUT 625. The AP 625 transmits it on its wireless interface and it is received by the test module wireless network interface card (NIC) 616.

The test module NIC may be any wireless NIC having the capability of time stamping received frames. An example of one such NIC is the AR2312 MAC/BB chip, manufactured by Atheros® Communications of Santa Clara, Calif. 2313, although other MAC NICs with similar capability may be substituted. The Atheros MAC chip has the capability of timestamping a received packet with one Ps accuracy. The timestamp information is stored in the receive Buffer Descriptor (BD) ring 620 with the packet.

A Packet Filter process 622 examines packets on the receive BD ring 620 and determines which packets are of interest in the latency computation. For instance, depending on the configuration of the MAC chip, various frames irrelevant to the latency measurement may be filtered from the packet stream to make sure only frames transmitted by the test module Ethernet interface 612 are passed to the timestamp extract process 624.

Because the transmit timestamp is contained in the packet itself, while the receive timestamp is a field in the receive buffer descriptor, the timestamp extract process 624 merely pairs up the timestamp information and passes it to the latency compute process 626. Timestamps may be correlated as described above.

The Latency Compute process 626 converts the timestamps to the same units and time scale, computes the difference between receive and transmit times and stores the result.

The latency measurement methods and apparatus of the present invention may also be adapted to measure latency from an RF input to an RF output of a DUT. In such a test scenario, each virtual client sends traffic to a fixed other virtual client. In other words, virtual client A sends to virtual client B and vice versa. Thus the pool of virtual clients is apportioned into two equal groups. A virtual client in Group A sends packets to a single virtual client in Group B; the Group B virtual clients do the same to the Group A virtual clients. Alternatively, each virtual client may send packets to every other virtual client, but for simplicity of description, the first scenario will be described with respect to FIG. 22.

Figure 22:
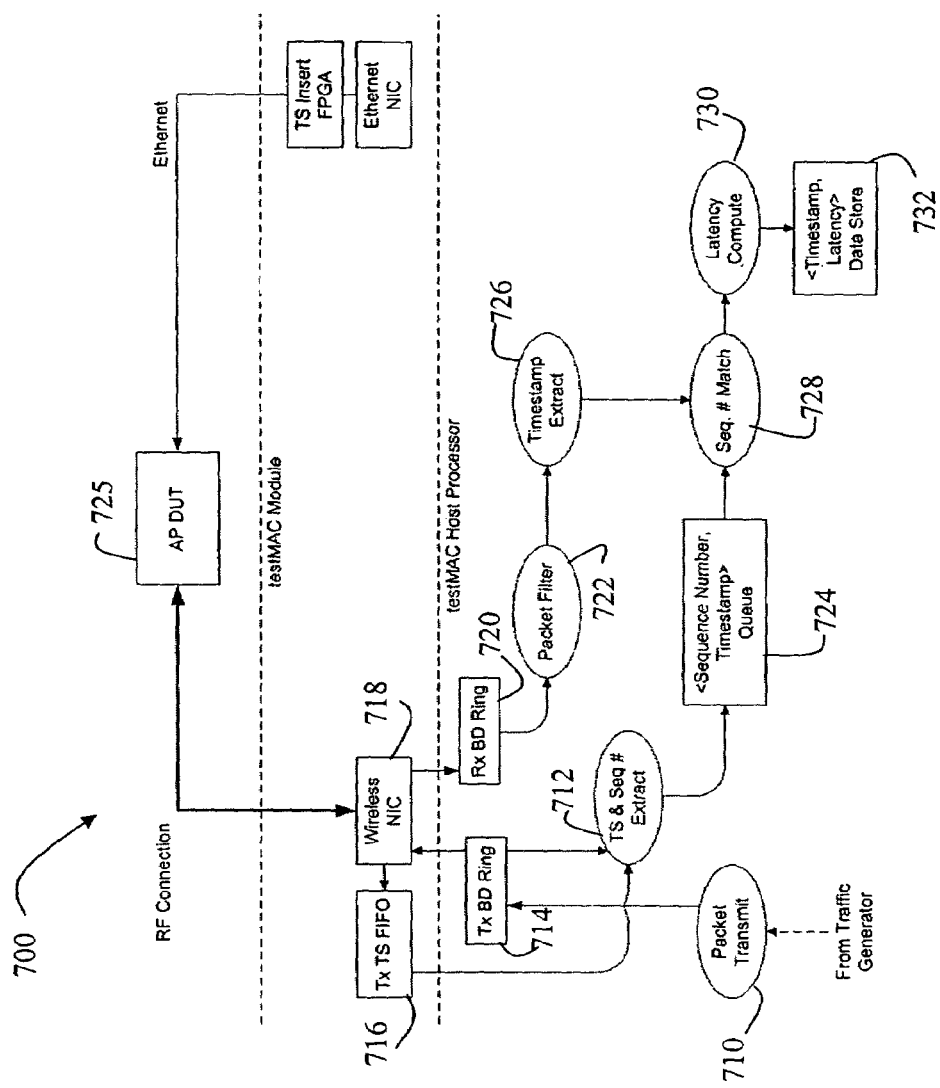
FIG. 22 is a data flow diagram provided to illustrate a method and system for measuring the latency in an RF input to RF output path of a DUT.

As shown in FIG. 22, packets are generated by a traffic generation process (not shown) and passed to the Packet Transmit process 710 which places them in the wireless NIC transmit buffer descriptor ring 714 for transmission.

A Timestamp and Sequence Number Extract process 712 is executed as part of a transmit completion interrupt, and performs the necessary operations to pair up the sequence number contained in a field in all transmitted packets with a timestamp read from the Transmit Timestamp FIFO 716. The output of this process placed into a queue 724 to wait for the same packet to be received on the wireless interface.

After having received the packet from the test module, the AP 725 eventually retransmits it on its wireless interface (as is the procedure for 802.11) and it is received by the test module wireless network interface card (NIC) 718, which places receive timestamp information in the receive Buffer Descriptor (BD) ring 720 for the packet.

A Packet Filter process 722 examines packets on the receive BD ring and determines which packets are of interest in the latency computation, filtering out extraneous frames as described above. After being approved by the Packet Filter process 722, the packet passes to another Timestamp and Sequence Number Extract process 726. The process reads the receive timestamp and the sequence number from their offsets in the packet, and passes the information to the Sequence Number Match process 728.

The Sequence Number Match process searches for the received sequence number in the <Sequence Number, Timestamp> queue 724. When the correct entry is located, it is passed along with the received timestamp and sequence number to the Latency Compute process 730.

The Latency Compute process computes the difference between receive and transmit times to measure the latency. On completion, it stores the transmit time and calculated latency in a data store for later processing or display.

Channel Effects Insertion

According to another aspect of the invention, the test module is able to distort signals in a transmission channel to emulate multipath and other channel effects. Thus, the network emulation may include circuitry such as that disclosed above with regard to FIGS. 2-13. Channel models may be obtained using channel sounding techniques. Referring briefly to FIG. 7, in any environment, transmitted signals (for example from AP 70) encounter physical and environmental effects before reaching a receiving device, such as laptop 72. The physical and environmental effects distorts the signal(s) in the channel, adding channel effects which reflect the air-link properties between the sending and receiving device. During DUT test, it is often desirable to analyze DUT operation in specific environments. Many existing systems use mathematically modeled simulations of air-link properties when analyzing DUT operation. The test administrator selects one of the mathematical models which most closely approximates the physical environment in which the DUT may be used, but usually the selection process involves trade-offs and as a result the mathematical model merely approximates the physical environment in which the DUT will be expected to perform.

The present invention facilitates air-link property modeling by allowing channel effects to be recorded at a destination device for different network topologies and physical environments. The recorded signals can then be played back by the network interface blocks during testing of the DUT, thereby permitting testing of the DUT in its intended environment.

Noise and common interfering signals (caused, for example, by radar, microwaves, phones, Bluetooth® devices or thermal or impulse noise) could also be generated by DSP in the interface block as separate signals without the transmit signal being present.

Accordingly, a modular wireless test architecture which may be used to create test environments capable of exercising a wide range of protocols, network topologies and device capabilities has been shown and described. The modular architecture includes an RF backplane, at least one RF combiner, and a channel emulation module which modifies RF signals transmitted through the module in accordance with selected channel effects. Emulation modules capable of emulating different channel effects of varying complexity may be easily swapped into the chassis depending upon the devices and capabilities to be tested. External background traffic may be injected into the transmission channel via the emulation module, and monitoring circuitry captures signal state in the channel for forwarding to internal or external traffic analyzers. As described above, a test module capable of generating and/or analyzing both SISO and MIMO traffic from multiple clients and APs on multiple interfaces may be coupled directly to the backplane to emulate additional network clients and access points, or may alternatively be directly coupled to a DUT. Improved latency measurement techniques allow the test module to accurately measure the latency between a variety of DUT network interfaces.

Having described an exemplary embodiment of the present invention, it will be appreciated that various modifications may be made without diverging from the spirit and scope of the invention. For example, as wireless protocols, topologies and capabilities continue to develop, channel emulation modules and test modules developed to test the evolving technology would be within the scope of the present invention.

The above specification has described present invention in terms of functional blocks delineated in a manner to facilitate description. However, it should be noted that the invention may be implemented in a variety of arrangements, using hardware, software or a combination thereof, and the present invention is not limited to the disclosed embodiment. While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of measuring latency through a device includes the steps of:
    generating a packet for transfer to the device, the packet having a sequence number associated therewith;
    storing the sequence number;
    forwarding the packet to a first network interface;
    forwarding the packet from the first network interface to the device;
    storing an indication of the time at which the packet is detected between the first network interface and the device, the indication not being stored in the packet;
    storing an indication of the time at which the packet is detected between a second network interface and the device;
    calculating a latency measurement by comparing the indication of the time at which the packet is detected between the first network interface and the device with the indication of the time at which the packet is detected between the second network interface and the device; and
    storing the latency measurement in memory.

2. The method according to claim 1, including the steps of:
    receiving, the packet from the device;
    generating a receive time stamp for the packet, the receive time stamp reflecting the time at which the packet was received from the device; and
    inserting the receive time stamp into the received packet; and
    forwarding the received packet to a second network interface.

3. The method according to claim 2, further including the steps of:
    matching a received sequence number of the received packet with a stored sequence number;
    retrieving a transmit time stamp associated with the stored sequence number; and calculating the latency measurement by comparing the transmit time stamp associated with the stored sequence number and the receive time stamp in the received packet.

4. The method according to claim 1, including the steps of:

receiving the packet from the device at the second network interface, including generating a receive time stamp at the second network interface and inserting the receive time stamp in the packet;

matching a sequence number of the received packet to a stored sequence number; and calculating the latency measurement by comparing a transmit time stamp associated with the stored sequence number and the receive time stamp in the received packet.

5. A method of measuring latency through a device includes the steps of:

generating a packet for transfer to the device, the packet having a sequence number associated therewith;

forwarding the packet to a first network interface;

forwarding the packet from the first network interface via time stamp generation logic which generates a transmit time stamp for the packet, the transmit time stamp reflecting the time at which the packet is forwarded from the first network interface to the device;

storing the transmit time stamp in memory, and not in the packet; and utilizing the stored transmit time to help produce an indication of latency.

6. The method of claim 5, including the steps of:

receiving the packet from the device at a second network interface, including generating a receive time stamp at the second network interface and inserting the receive time stamp in the packet;

calculating the latency measurement by comparing the transmit time stamp in the memory to the receive time stamp in the received packet.

7. An apparatus for measuring the latency of a device includes:

means for generating a packet to transmit to the device, the packet having a sequence number associated therewith;

a first network interface card for transmitting the packet to the device;

a memory which stores an indication of the time at which the packet is detected between the first network interface and the device, the indication not being stored in the packet;

a memory which stores an indication of the time at which the packet is detected between a second network interface and the device;

a processor which calculates a latency measurement by comparing the indication of the time at which the packet is detected between the first network interface and the device with the indication of the time at which the packet is detected between the second network interface and the device; and a memory which stores the latency measurement.

8. The apparatus of claim 7, including:

receive time stamp means, disposed between the device and a second network interface, including:

means for generating receive time stamps for packets received from the device and for inserting the received time stamps into the associated packets; and means for forwarding the received packet with the incorporated received time stamp to the second network interface.

9. The apparatus of claim 8, further including:

matching means for matching sequence number of received packets to sequence numbers in the queue to retrieve a transmit time stamp associated with the received time stamp; and means for calculating the latency measurement by comparing the transmit time stamp with the received time stamp.

10. The apparatus of claim 7, including:

receive time stamp means, included in the second network interface, and including means for generating receive time stamps for packets received from the device and for inserting the received time stamps into the associated packets.

11. The apparatus of claim 10, further including:

matching means for matching sequence number of received packets to sequence numbers in the queue to retrieve a transmit time stamp associated with the received time stamp; and means for calculating the latency measurement by comparing the transmit time stamp with the received time stamp.

12. An apparatus for measuring the latency of a device includes:

means for generating a packet to transmit to the device, the packet having a sequence number associated therewith;

a network interface card for transmitting the packet to the device; and transmit time stamp means disposed between the network interface card and the device, for capturing a transmit time stamp for the packet and inserting the transmit time stamp into memory such that the time stamp is not inserted into the packet, the time stamp reflecting the time the packet is transmitted from the first network interface card.

13. The apparatus of claim 12, further comprising:

receive time stamp means, included in a second network interface, and including means for generating receive time stamps for packets received from the device and for inserting the received time stamps into the associated packets.

14. The apparatus of claim 13, further including:

extraction means for extracting the receive time stamp from the packet; and means for calculating the latency measurement by comparing the transmit time stamp with the received time stamp.

15. The method of claim 3, further including the step of identifying a drift between time stamps associated with first network interface and time stamps associated with second interface and modifying latency measurement in accordance with the identified drift.

* * * * *